United States Patent
Okubo et al.

(10) Patent No.: US 12,036,712 B2
(45) Date of Patent: Jul. 16, 2024

(54) MOLDING CONDITIONS DETERMINATION ASSIST DEVICE AND RESIN STATE ESTIMATION DEVICE

(71) Applicant: JTEKT CORPORATION, Osaka (JP)

(72) Inventors: Yusuke Okubo, Kariya (JP); Sachiko Tachibana, Okazaki (JP); Shota Mizoguchi, Kariya (JP); Toshiyuki Baba, Kashihara (JP); Kouji Kimura, Shiki-gun (JP); Tomoya Adachi, Kashiwara (JP)

(73) Assignee: JTEKT CORPORATION, Kariya (JP)

( * ) Notice: Subject to any disclaimer, the term of this patent is extended or adjusted under 35 U.S.C. 154(b) by 46 days.

(21) Appl. No.: 17/338,042

(22) Filed: Jun. 3, 2021

(65) Prior Publication Data

US 2021/0379807 A1    Dec. 9, 2021

(30) Foreign Application Priority Data

Jun. 5, 2020   (JP) ................................ 2020-098735
Jun. 5, 2020   (JP) ................................ 2020-098736
Jun. 5, 2020   (JP) ................................ 2020-098737

(51) Int. Cl.
*B29C 45/76*   (2006.01)

(52) U.S. Cl.
CPC .... *B29C 45/76* (2013.01); *B29C 2945/76006* (2013.01); *B29C 2945/7604* (2013.01);
(Continued)

(58) Field of Classification Search
CPC .......... B29C 45/76; B29C 2945/76949; B29C 2945/76257; B29C 2945/7604; B29C 2945/76006
See application file for complete search history.

(56) References Cited

U.S. PATENT DOCUMENTS

2017/0031330 A1*   2/2017   Shiraishi ............... G05B 19/042
2019/0039274 A1*   2/2019   Fick ......................... B29C 45/76
(Continued)

FOREIGN PATENT DOCUMENTS

JP     5-96592 A     4/1993
JP     5-309711 A    11/1993
(Continued)

OTHER PUBLICATIONS

Office Action issued Feb. 13, 2024, in corresponding Japanese Patent Application No. 2020-098735 (with English Translation), 11 pages.
(Continued)

*Primary Examiner* — Alison L Hindenlang
*Assistant Examiner* — Shibin Liang
(74) *Attorney, Agent, or Firm* — Oblon, McClelland, Maier & Neustadt, L.L.P.

(57) ABSTRACT

There are provided a molding conditions determination assist device and a resin state estimation device including: a quality estimation unit which estimates quality of the mold products by a machine learning on the basis of a detection data; a quality transition storage unit which accumulates the estimated quality of the mold products and stores a quality transition with respect to the accumulated quality of the mold products; a tendency evaluation unit which evaluates a quality change tendency with respect to a prescribed standard quality on the basis of the quality transition; a relationship storage unit which stores a relationship between the quality change tendency and a modification amount of the molding conditions for returning the quality to the standard quality; and a modification conditions determination unit which determines the modification amount of the molding conditions on the basis of the quality change tendency and the relationship.

11 Claims, 26 Drawing Sheets

(52) U.S. Cl.
CPC .............. *B29C 2945/76257* (2013.01); *B29C 2945/76949* (2013.01)

(56) References Cited

U.S. PATENT DOCUMENTS

| | | |
|---|---|---|
| 2020/0094461 A1 | 3/2020 | Okubo et al. |
| 2020/0101649 A1 | 4/2020 | Okubo et al. |

FOREIGN PATENT DOCUMENTS

| | | | | |
|---|---|---|---|---|
| JP | 2006-239940 A | 9/2006 | | |
| JP | 2006-281662 A | 10/2006 | | |
| JP | 2017-119425 A | 7/2017 | | |
| JP | 2018182661 | * 9/2018 | ........... | B29C 45/766 |
| JP | 2019-166702 A | 10/2019 | | |
| JP | 2020-49843 A | 4/2020 | | |
| JP | 2020-49929 A | 4/2020 | | |
| JP | 2020-087446 A | 6/2020 | | |

OTHER PUBLICATIONS

Office Action issued Feb. 13, 2024, in corresponding Japanese Patent Application No. 2020-098736 (with English Translation), 11 pages.

\* cited by examiner

FIG. 5
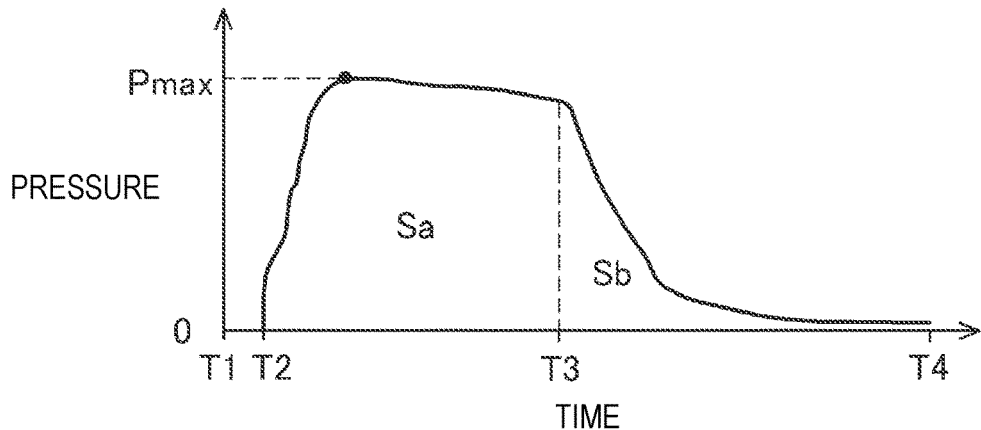
FIG. 6
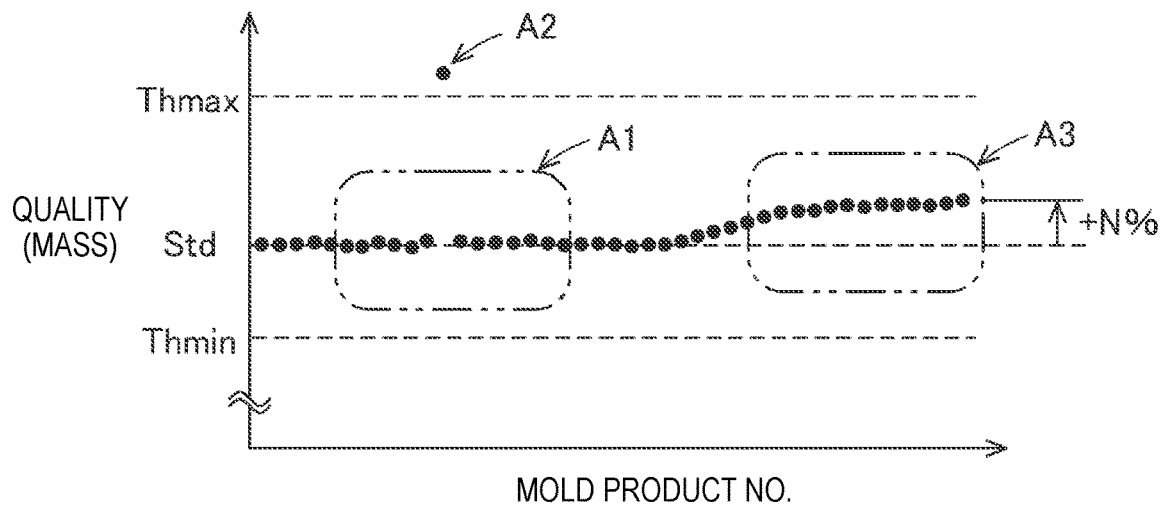
FIG. 7
QUALITY CHANGE TENDENCIES
| QUALITY ITEM | DEVIATION | DEGREE OF VARIATION |
|---|---|---|
| MASS | +2.2% | STABLE |
| DIMENSION | +0.3% | STABLE |
| VOID VOLUME | −0.5% | STABLE |

FIG. 8

| | QUALITY ITEM (VOID VOLUME) | | | | |
|---|---|---|---|---|---|
| | QUALITY ITEM (DIMENSION) | | | | |
| | QUALITY ITEM (MASS) | | | | |
| DEVIATION | MOLDING CONDITIONS | | | | |
| | INJECTION RATE | HOLDING PRESSURE | HOLDING TIME | DIE TEMPERATURE | COOLING TIME |
| +3% | | | | | |
| +2% | | | | | |
| +1% | | | | | |
| -1% | | | | | |
| -2% | | | | | |
| -3% | | | | | |

FIG. 21
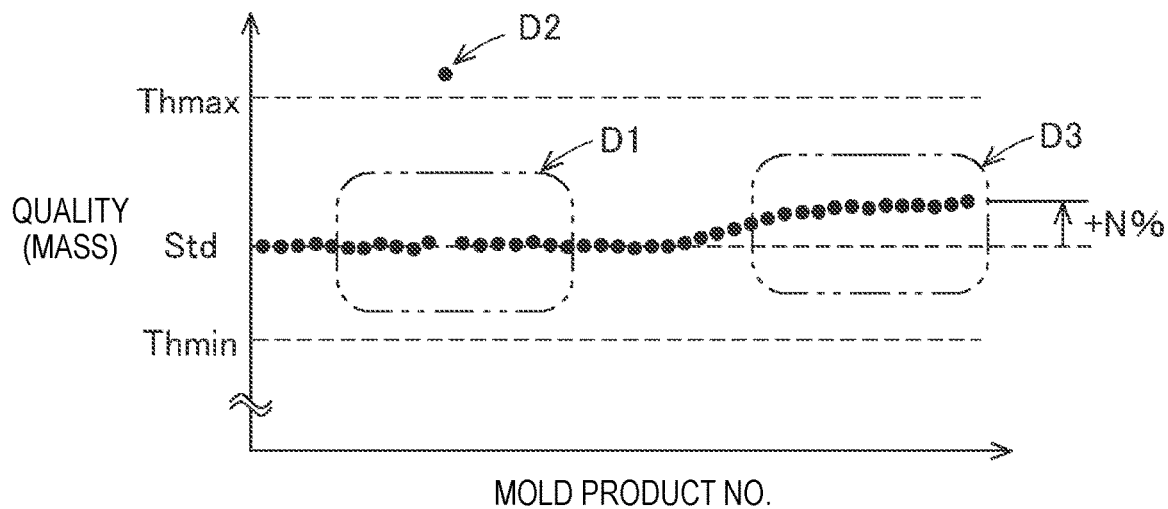
FIG. 22
QUALITY CHANGE TENDENCIES
| QUALITY ITEM | DEVIATION | DEGREE OF VARIATION |
|---|---|---|
| MASS | +2.2% | STABLE |
| DIMENSION | +0.3% | STABLE |
| VOID VOLUME | −0.5% | STABLE |
FIG. 23
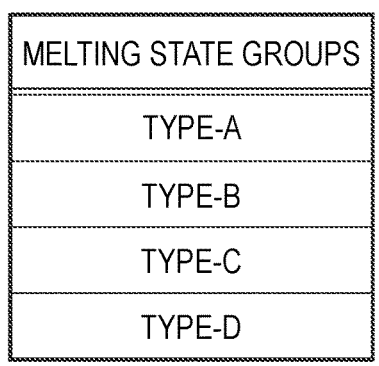

FIG. 30
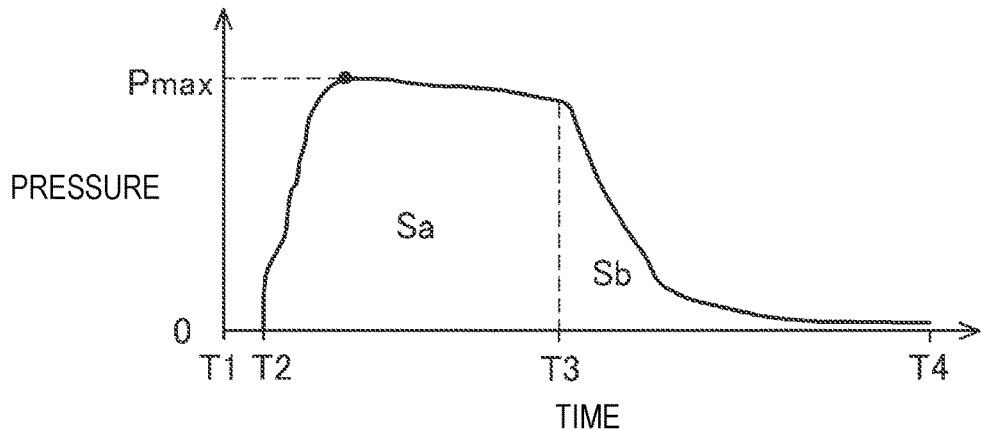
FIG. 31
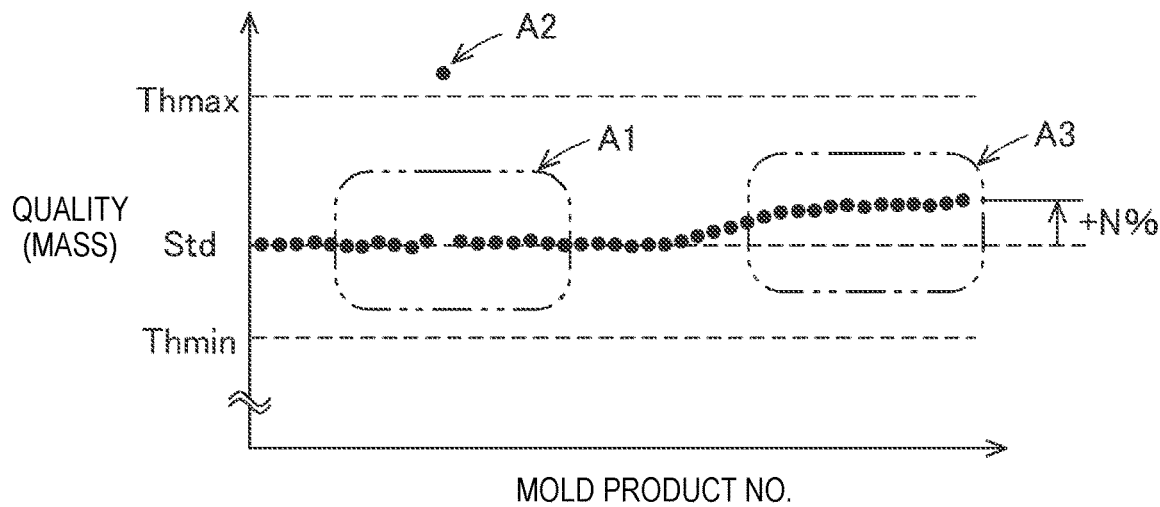
FIG. 32
QUALITY CHANGE TENDENCIES
| QUALITY ITEM | DEVIATION | DEGREE OF VARIATION |
|---|---|---|
| MASS | +2.2% | STABLE |
| DIMENSION | +0.3% | STABLE |
| VOID VOLUME | −0.5% | STABLE |

MOLDING CONDITIONS DETERMINATION ASSIST DEVICE AND RESIN STATE ESTIMATION DEVICE

CROSS-REFERENCE TO RELATED APPLICATIONS

This application is based on and claims priority under 35 USC 119 from Japanese Patent Application No. 2020-098735 filed on Jun. 5, 2020, Japanese Patent Application No. 2020-098736 filed on Jun. 5, 2020 and Japanese Patent Application No. 2020-098737 filed on Jun. 5, 2020, the contents of which are incorporated herein by reference.

TECHNICAL FIELD

The present disclosure relates to a molding conditions determination assist device and a resin state estimation device.

BACKGROUND ART

A worker needs to modify molding conditions when a defective product has occurred in a method of producing a mold product by supplying molten material obtained by melting molding material or resin into the cavity of a die of a molding machine. However, modifying the molding conditions requires skilled techniques. It is difficult for an unskilled worker to judge to what degrees what molding conditions should be modified.

In the above circumstances, research relating to artificial intelligence has advanced in recent years. For example, JP2020-49843A and JP2020-49929A disclose determining modification amounts of molding conditions by machine learning. JP2002-49843A discloses a technique in which a relationship between quality items of a mold product and molding conditions is acquired in advance by machine learning. When a failure has occurred in a certain quality item, what molding condition items should be modified is output. JP2020-49929A discloses a technique that modification amounts of molding conditions are determined by machine learning on the basis of detection data detected during molding by sensors attached to a molding machine.

In the related art as described above, even if molding is performed under the same molding conditions, the quality of a mold product may vary due to, for example, a variation of the ambient temperature. For example, even in one day, the ambient temperature in the morning and that in the daytime are different from each other. The quality of a mold product may vary as the ambient temperature increases from the morning to the noon and as the ambient temperature decreases from the noon to the evening. Likewise, the quality of a mold product may vary slowly as the season changes. Furthermore, there may occur an event that the quality of a mold product after a change of the manufacturing lot of a molding material (base material) is different than before that. Thus, in a situation that the quality of a mold product varies due to external factors, it is desired to modify the molding conditions so that the quality of a mold product comes closer to standard quality.

Furthermore, it has been found that the quality of a mold product varies depending on melting state of resin in the cavity. For example, the quality of a mold product when the flowability of resin in the cavity is high is different than when it is low.

Whereas the melting state of resin in the cavity is naturally influenced by the control parameters that are used in control in an injection molding machine, it is considered to be also influenced by other factors such as structures and functions of components of the injection molding machine and the ambient temperature. That is, proper modification amounts of the molding conditions would be determined if a melting state of resin in the cavity can be recognized. However, it is difficult to recognize a melting state of resin in the cavity.

Still further, even if molding is performed under the same conditions, the quality of a mold product may become different due to slight differences in the components of a molding material (base material). Thus, as mentioned above, the quality of a mold product varies due to external factors or slight differences in the components of a molding material, it is desired to modify the molding conditions so that the quality of a mold product comes closer to standard quality.

SUMMARY OF INVENTION

In view of the above circumstances in the related art, the present disclosure provides a molding conditions determination assist device capable of modifying the molding conditions so that the quality of a mold product comes closer to standard quality in a case that the quality of a mold product varies due to external factors.

The disclosure also provides a resin state estimation device capable of estimating a melting state of resin in a cavity. In addition, the disclosure provides a molding conditions determination assist device capable of modifying the molding conditions so that the quality of a mold product comes closer to standard quality using the resin state estimation device.

Furthermore, the disclosure provides a molding conditions determination assist device capable of modifying the molding conditions so that the quality of a mold product comes closer to standard quality in a case that the quality of a mold product varies due to external factors or slight differences in the components of a molding material (base material).

(1. Molding Conditions Determination Assist Device)

One aspect of the disclosure provides a molding conditions determination assist device which is applied to a molding method of producing a mold product by supplying molten material obtained by melting molding material to a cavity of a die of a molding machine and determines molding conditions for producing the mold product. The molding conditions determination assist device includes a detection data acquisition unit which acquires detection data detected during molding by sensors attached to the molding machine; a quality estimation unit which estimates quality of the mold product by machine learning on the basis of the detection data; a quality transition storage unit which accumulates pieces of quality information of plural quality-estimated mold products and stores a quality transition of the quality-information-accumulated mold products; a tendency evaluation unit which evaluates a quality change tendency with respect to prescribed standard quality on the basis of the quality transition; a relationship storage unit which stores a relationship between the quality change tendency and modification amounts of molding conditions for returning the quality to the standard quality; and a modification conditions determination unit which determines modification amounts of the molding conditions on the basis of the quality change tendency obtained by the tendency evaluation unit and the relationship stored in the relationship storage unit.

The quality transition storage unit accumulates pieces of quality information of mold products estimated by machine learning and stores a quality transition of the mold products. The quality transition is information that pieces of quality information of plural mold products are arranged in order of molding. Thus, the tendency evaluation unit can evaluate a quality change tendency on the basis of the quality transition of the plural consecutive mold products.

In particular, the tendency evaluation unit evaluates a quality change tendency with respect to the prescribed standard quality. For example, the tendency evaluation unit can generate, as a quality change tendency, an evaluation result that a state that the quality is deviated from the prescribed standard quality is continuing, the quality is varying in an allowable quality range including the prescribed standard quality, or the like.

Furthermore, the relationship storage unit is stored with the relationships between in advance. The relationship storage unit is stored with the relationship between the quality change tendency and the modification amounts of the molding conditions. This relationship may be set using know-how of skilled workers, output results of machine learning, experimental results, etc. The modification conditions determination unit determines modification amounts of the molding conditions on the basis of a newly obtained quality change tendency and the relationship stored in the relationship storage unit. The relationship stored in the relationship storage unit relates to the modification amounts of the molding conditions for returning the quality to the prescribed standard quality. Thus, if the molding conditions of the molding machine are modified according to the modification amounts of the molding conditions determined by the modification conditions determination unit, the quality of a mold product produced next can be made closer to the prescribed standard quality.

That is, even in a case that the quality of a mold product varies due to external factors such as an ambient temperature, the molding conditions can be modified so that the quality of a mold product becomes equal to the prescribed standard quality by recognizing a quality change tendency. This allows not only a skilled worker but also an unskilled worker to modify the molding condition so that a mold product has good quality.

(2-1. Resin State Estimation Device)

Another aspect of the disclosure provides a resin state estimation device which estimates a melting state of resin in a cavity of a die of an injection molding machine, including a detection data acquisition unit which acquires detection data detected during molding by sensors attached to the injection molding machine; a feature quantities generation unit which generates plural detection data feature quantities on the basis of the detection data; a control parameters acquisition unit which acquires plural control parameters to be used for control in the injection molding machine; a discrimination parameters calculation unit which calculates resin state discrimination parameters that correspond to respective feature quantities and indicate a resin melting state on the basis of the feature quantities and the control parameters with a definition that the resin melting state is represented by the feature quantities and the control parameters; and a group acquisition unit which acquires a resin melting state group on the basis of the resin state discrimination parameters using a multivariate analysis in which the resin state discrimination parameters as explanatory variables, with an assumption that resin melting states are classified into plural groups.

Detection data that are detected during molding by the sensors attached to the injection molding machine are considered to be influenced by the control parameters of the injection molding machine and a melting state of resin in the cavity. In other words, it is defined that a resin melting state is represented by feature quantities and control parameters generated from the detection data.

Based on this definition, the discrimination parameters calculation unit calculates resin state discrimination parameters that correspond to respective feature quantities and indicate a resin melting state on the basis of the feature quantities and the control parameters. That is, the resin state discrimination parameters are generated in the same number as the number of feature quantities.

With the assumption that resin melting states are classified into plural groups, the group acquisition unit acquires a resin melting state group on the basis of the resin state discrimination parameters using a multivariate analysis in which the resin state discrimination parameters as explanatory variables. Although it is not necessary to define the resin melting state groups clearly, resin melting states can be classified into groups using the degree of flowability as one factor.

That is, the resin state estimation device makes it possible to classify a melting state of resin existing in the cavity during molding of a mold product concerned as belonging to one group using, for example, the degree of flowability of resin as one factor by performing computation using detection data and control parameter values. This makes it possible to determine modification amounts of the molding conditions according to the group.

(2-2. Molding Conditions Determination Assist Device)

A still another aspect of the disclosure provides a molding conditions determination assist device which is applied to a molding method of producing a mold product by supplying molten material obtained by melting a molding material to a cavity of a die of an injection molding machine and determines molding conditions for producing the mold product, including the above-described resin state estimation device; a quality estimation unit which estimates quality of the mold product by machine learning on the basis of the detection data; a quality transition storage unit which accumulates estimated pieces of quality information of plural quality-estimated mold products and stores a quality transition of the quality-information-accumulated mold products; a tendency evaluation unit which evaluates a quality change tendency with respect to prescribed standard quality on the basis of the quality transition; a relationship storage unit which stores relationships between the quality change tendency and modification amounts of molding conditions for returning the quality to the standard quality in such a manner that the relationships are correlated with the respective resin melting state groups; and a modification conditions determination unit which determines modification amounts of the molding conditions on the basis of the quality change tendency obtained by the tendency evaluation unit, the resin melting state group acquired by the group acquisition unit, and the relationships stored in the relationship storage unit.

That is, modification amounts of the molding conditions are determined using a resin melting state group acquired by the resin state estimation device. This makes it possible to determine proper modification amounts of the molding conditions easily.

(3. Molding Conditions Determination Assist Device)

A further aspect of the disclosure provides a molding conditions determination assist device which is applied to a molding method of producing a mold product by supplying molten material obtained by melting molding material to a cavity of a die of a molding machine and determines molding conditions for producing the mold product. The molding conditions determination assist device includes a detection data acquisition unit which acquires detection data detected during molding by sensors attached to the molding machine; a quality estimation unit which estimates quality of the mold product by machine learning on the basis of the detection data; a quality transition storage unit which accumulates pieces of quality information of plural quality-estimated mold products and stores a quality transition of the quality-information-accumulated mold products; a tendency evaluation unit which evaluates a quality change tendency with respect to prescribed standard quality on the basis of the quality transition; a melting state estimation unit which estimates a melting state of the molten material in the cavity on the basis of the detection data; a relationship storage unit which stores relationships between the quality change tendency and modification amounts of molding conditions for returning the quality to the standard quality in such a manner that the relationships are correlated with respective melting states; and a modification conditions determination unit which determines modification amounts of the molding conditions on the basis of the quality change tendency obtained by the tendency evaluation unit, the melting state estimated by the melting state estimation unit, and the relationships stored in the relationship storage unit.

The quality transition storage unit accumulates pieces of quality information of mold products estimated by machine learning and stores a quality transition of the mold products. The quality transition is information that pieces of quality information of plural mold products are arranged in order of molding. Thus, the tendency evaluation unit can evaluate a quality change tendency on the basis of the quality transition of the plural consecutive mold products.

In particular, the tendency evaluation unit evaluates a quality change tendency with respect to the prescribed standard quality. For example, the tendency evaluation unit can generate, as a quality change tendency, an evaluation result that a state that the quality is deviated from the prescribed standard quality is continuing, the quality is varying in an allowable quality range including the prescribed standard quality, or the like.

Furthermore, the melting state estimation unit estimates a melting state of molten material in the cavity on the basis of the detection data. The melting state depends on the components of the molding material (base material). For example, variable factors of the components of the molding material (base material) include a water content, lengths and a proportion of reinforcement fibers, the molecular weights of main components, etc. And the melting state in the cavity influences detection data obtained during molding. As such, the melting state estimation unit can estimate a melting state by using actual detection data that depends on a melting state during molding.

The relationship storage unit is stored with the relationships between the quality change tendency and the modification amounts of molding conditions in advance in such a manner that the relationships are correlated with the respective melting states of molten material in the cavity. The relationship storage unit is stored with the relationships between the quality change tendency and the modification amounts of molding conditions for the respective melting state types of molten material. These relationships may be set using know-how of skilled workers, output results of machine learning, experimental results, etc.

The modification conditions determination unit determines modification amounts of the molding conditions on the basis of a newly obtained quality change tendency, a newly estimated melting state of molten material in the cavity, and the relationships stored in the relationship storage unit. The relationships stored in the relationship storage unit relates to the modification amounts of the molding conditions for returning the quality to the prescribed standard quality. In particular, each set of modification amounts of the molding conditions is one determined according to a melting state of molten material in the cavity. Thus, if the molding conditions of the molding machine are modified according to the modification amounts of the molding conditions determined by the modification conditions determination unit, the quality of a mold product produced next can be made closer to the prescribed standard quality.

That is, even in a case that the quality of a mold product varies due to external factors such as an ambient temperature and slight differences in the components of a molding material (base material), the molding conditions can be modified so that the quality of a mold product produced next becomes equal to the prescribed standard quality by recognizing a quality change tendency and, furthermore, recognizing a melting state of molten material in the cavity. This allows not only a skilled worker but also an unskilled worker to modify the molding condition so that a mold product has good quality.

BRIEF DESCRIPTION OF DRAWINGS

FIG. 5 is a graph showing detection data;

FIG. 6 is a graph showing a quality transition;

FIG. 7 is a table showing quality change tendencies;

FIG. 8 is tables showing relationships between quality deviations and modification amounts;

FIG. 21 is a graph showing a quality transition;

FIG. 22 is a table showing quality change tendencies;

FIG. 23 is a table showing resin melting state groups;

FIG. 30 is a graph showing detection data;

FIG. 31 is a graph showing a quality transition;

FIG. 32 is a table showing quality change tendencies;

DETAILED DESCRIPTION OF EMBODIMENTS

A molding conditions determination assist device according to a first embodiment will be described below. However, the concept of the present disclosure is not limited to the first embodiment and various design changes can be made without departing from the spirit and scope of the disclosure.

1. Application Targets

The molding conditions determination assist device is applied to a molding method for producing a mold product by supplying molten material obtained by melting molding material into the cavity of a die of a molding machine. An example molding machine as an application target can be an injection molding machine that performs injection molding using resin, rubber, or the like (molding material). Other example molding machines as application targets can be a blow molding machine and a compression molding machine. Examples resins as molding materials are a thermoplastic resin such as polyamide itself and a reinforced resin obtained by adding a bulking agent to a thermoplastic resin base material. An example bulking agent is a micrometer-size filler or a nanometer-size filler. Example fillers are glass fiber and carbon fiber.

2. Molding Machine System 1

Figure 1:
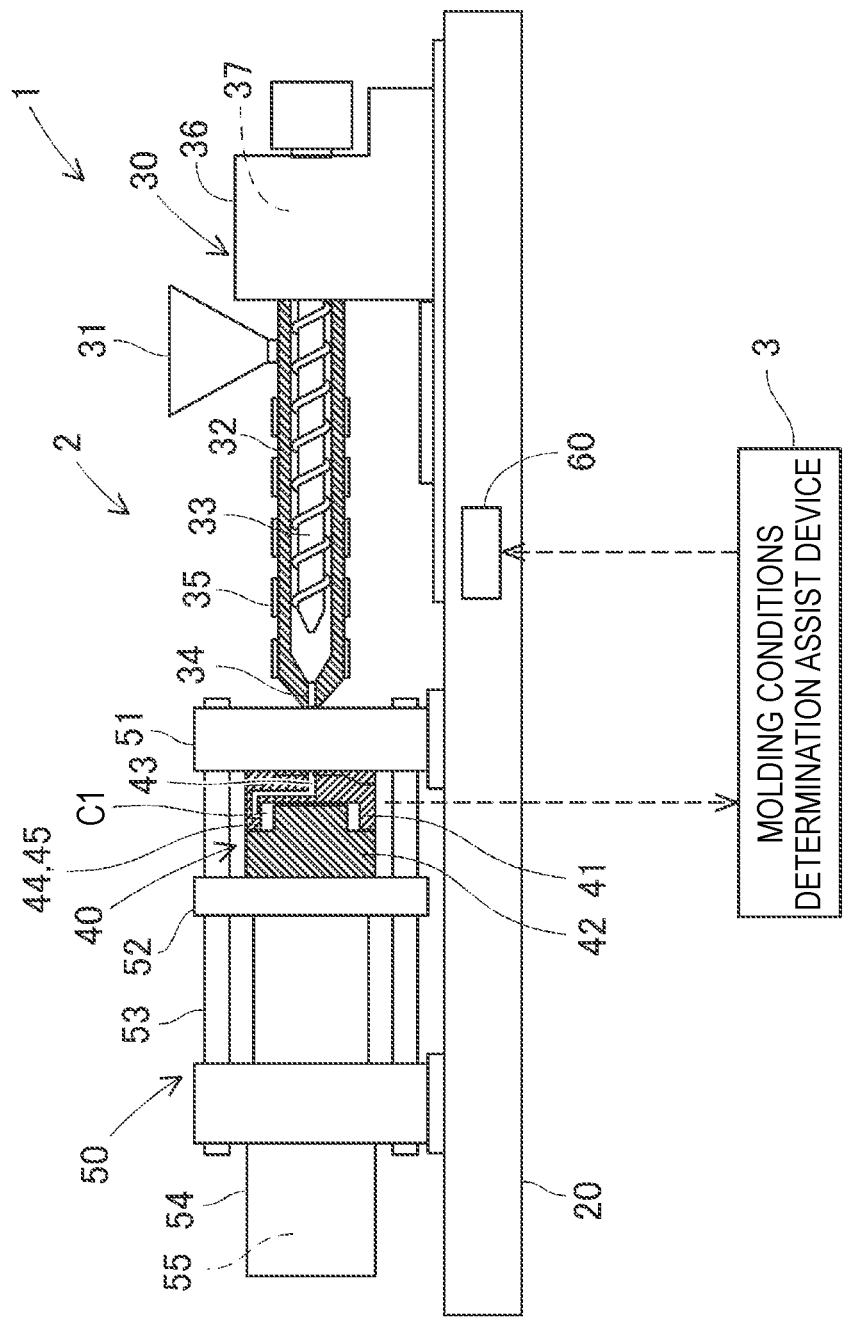
FIG. 1 is a diagram showing an overall configuration of a molding machine system according to a first embodiment.

A molding machine system 1 including a molding conditions determination assist device will be described with reference to FIG. 1. As shown in FIG. 1, the molding machine system 1 is equipped with a molding machine 2 and a molding conditions determination assist device 3.

The molding machine 2 is an injection molding machine, a blow molding machine, a compression molding machine, or the like. In this example, the molding machine 2 is an injection molding machine. For example, the molding machine 2 produces a resin mold product by molding. The molding conditions determination assist device 3 is a device for determining molding conditions of the molding machine 2. In particular, in this example, the molding conditions determination assist device 3 determines modification amounts of molding conditions for increasing the quality of a mold product from the quality of one that has been produced under certain molding conditions.

The molding conditions determination assist device 3 may be either a device that is separate from the molding machine 2 or a built-in device of the molding machine 2. Alternatively, the molding conditions determination assist device 3 may be such that part of it is incorporated in the molding machine 2 and the remaining part is implemented as a separate device. Where all or part of the molding conditions determination assist device 3 is separate from the molding machine(s) 2, the separate part maybe connected to either only a single molding machine 2 or plural molding machines 2. In the latter case, the separate part of the molding conditions determination assist device 3 and the plural molding machines 2 constitute the same network and can communicate with each other.

3. Molding Machine 2

3-1. Configuration of Molding Machine 2

The configuration of an injection molding machine as an example of the molding machine 2 will be described with reference to FIG. 1. The molding machine 2 is mainly equipped with a bed 20, an injection machine 30, a die 40, a clamping device 50, and a control device 60.

The injection machine 30 is mounted on the bed 20. The injection machine 30 is a machine for melting molding material and supplying resulting molten material to a cavity C1 of the die 40 by applying pressure to the molten material. The injection machine 30 is mainly equipped with a hopper 31, a heating cylinder 32, a screw 33, a nozzle 34, a heater 35, a drive device 36, and an injection machine sensor 37.

The hopper 31 is an inlet of pellets (grainy molding material) that are molding material (base material). The heating cylinder 32 applies pressure to molten material obtained by melting, by heating, the pellets that are input to the hopper 31. The heating cylinder 32 is disposed so as to be movable with respect to the bed 20 in the axial direction of the heating cylinder 32. The screw 33 is disposed inside the heating cylinder 32 so as to be rotatable and movable in the axial direction. The nozzle 34, which is an injection outlet provided at the tip of the heating cylinder 32, supplies molten material into the die 40 from inside the heating cylinder 32 when the screw 33 is moved in the axial direction.

Disposed, for example, outside the heating cylinder 32, the heater 35 heats pellets existing inside the heating cylinder 32. For example, the drive device 36 moves the heating cylinder 32 in the axial direction and rotates the screw 33 and moves it in the axial direction. The injection machine sensor 37 is a generic term of sensors for acquiring a molten material storage amount, a holding pressure, a holding time, an injection rate, a state of the drive device 36, and other parameters. The injection machine sensor 37 may acquire not only the above kinds of information but also various other kinds of information.

The die 40 is equipped with a fixed-side first die 41 and a movable-side second die 42. In the die 40, the cavity C1 is formed between the first die 41 and the second die 42 by clamping the first die 41 and the second die 42 together. The first die 41 has a supply passage 43 (sprue, runner, and gate) for guiding, to the cavity C1, molten material supplied from the nozzle 34. The die 40 is further equipped with pressure sensors 44 and temperature sensors 45. The pressure sensors 44 detect pressures received from the molten material existing in the supply passage 43. The temperature sensors 45 detect, directly, temperatures of the molten material existing in the supply passage 43.

The clamping device 50 is mounted on the bed 20 so as to be opposed to the injection machine 30. The clamping device 50 performs an operation of opening/closing the die 40 and prevents the die 40 from being opened by pressure of molten material injected into the cavity C1 in a state that the die 40 is clamped.

The clamping device 50 is equipped with a fixed plate 51, a movable plate 52, die bars 53, a drive device 54, and a clamping device sensor 55. The first die 41 is fixed to the fixed plate 51. Capable of coming into contact with the nozzle 34 of the injection machine 30, the fixed plate 51 guides molten material ejected from the nozzle 34 to the die 40. The second die 42 is fixed to the movable plate 52. The movable plate 52 can come closer to and go away from the fixed plate 51. The die bars 53 support the movable plate 52 being moved. Being, for example, a cylinder device, the drive device 54 moves the movable plate 52. The clamping device sensor 55 is a generic term of sensors for acquiring a clamping force, a die temperature, a state of the drive device 54, and other parameters.

The control device 60 controls the drive device 36 of the injection machine 30 and the drive device 54 of the clamping device 50. For example, the control device 60 acquires various kinds of information from the injection machine sensor 37 and the clamping device sensor 55 and controls the drive device 36 of the injection machine 30 and the drive device 54 of the clamping device 50 so that they operate according to operation command data.

3-2. Molding Method

A molding method for forming a mold product by the molding machine 2 will be described below. In the molding method of the molding machine 2, an amount measuring step, a clamping step, an injection and filling step, a holding step, a cooling step, and a release and ejection step are executed sequentially in one cycle. These steps are executed sequentially again in producing the next mold product. The amount measuring step and the clamping step constitute a start/preparation step, the injection and filling step, the holding step, and the cooling step make up a molding step, and the release and ejection step is an ending step. Alternatively, an initial part (to immediately after die opening) of the release and ejection step may be included in the molding step, in which case the ending step includes only the latter part of the release and ejection step.

In the amount measuring step, molten material is stored between the tip of the screw 33 and the nozzle 34 inside the heating cylinder 32 while pellets are melted by heating by the heater 35 and shearing friction heat generated by rotation of the screw 33. Since the screw 33 retreats as the storage amount of molten material increases, a storage amount of molten material is measured on the basis of a retreat position of the screw 33.

In the clamping step which follows the amount measuring step, clamping is performed in which the first die 41 and the second die 42 are combined together by moving the movable plate 52. Furthermore, the heating cylinder 32 is moved in the axial direction so that it comes closer to the clamping device 50 and the nozzle 34 is connected to the fixing plate 51 of the clamping device 50. Subsequently, in the injection and filling step, the screw 33 is moved toward the nozzle 34 by a prescribed pushing force in a state that the rotation of the screw 33 is stopped, whereby molten material is injected into the die 40 at a high pressure and fills up the die 40. The process moves to the holding step as soon as the cavity C1 is filled with molten material.

In the holding step, holding processing is performed in which a prescribed pressure (holding pressure) is applied to the molten material in the cavity C1 for a prescribed time by pressing molten material further into the cavity C1 that is already filled with molten material. More specifically, the prescribed holding pressure is applied to the molten material by applying a prescribed pushing force to the screw 33.

After the holding processing has been performed at the prescribed holding pressure for the prescribed time, the process moves to the cooling step. In the cooling step, processing of decreasing the holding pressure by stopping the pushing-in of molten material is performed and the die 40 is cooled, whereby the molten material that has been supplied to the die 40 solidifies. Finally, in the release and ejection step, the second die 42 is separated from the first die 41 and a mold product is taken out.

3-3. Die 40

Figure 2:
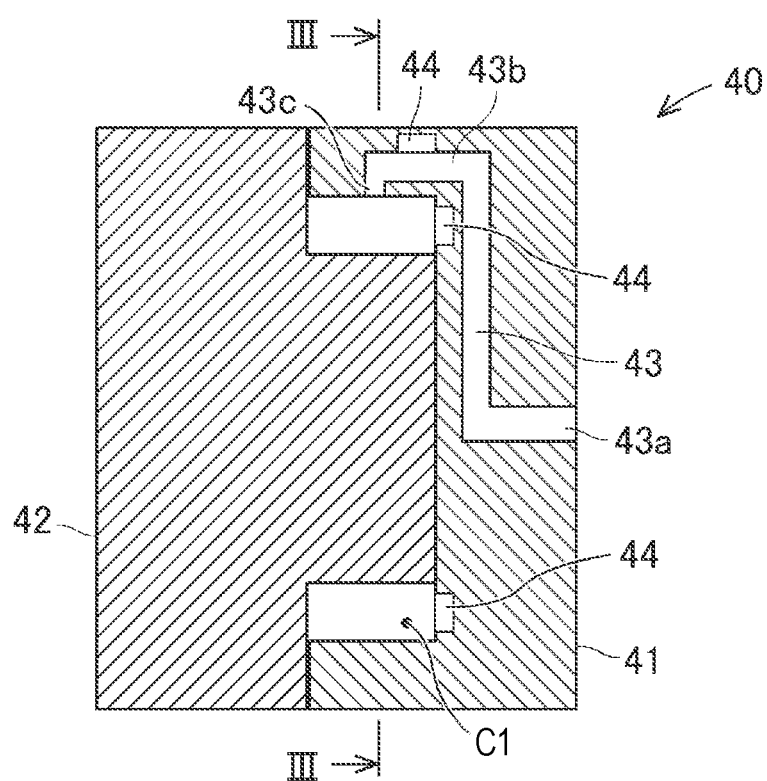
FIG. 2 is an enlarged view of a die of a molding machine shown in FIG. 1.
Figure 3:
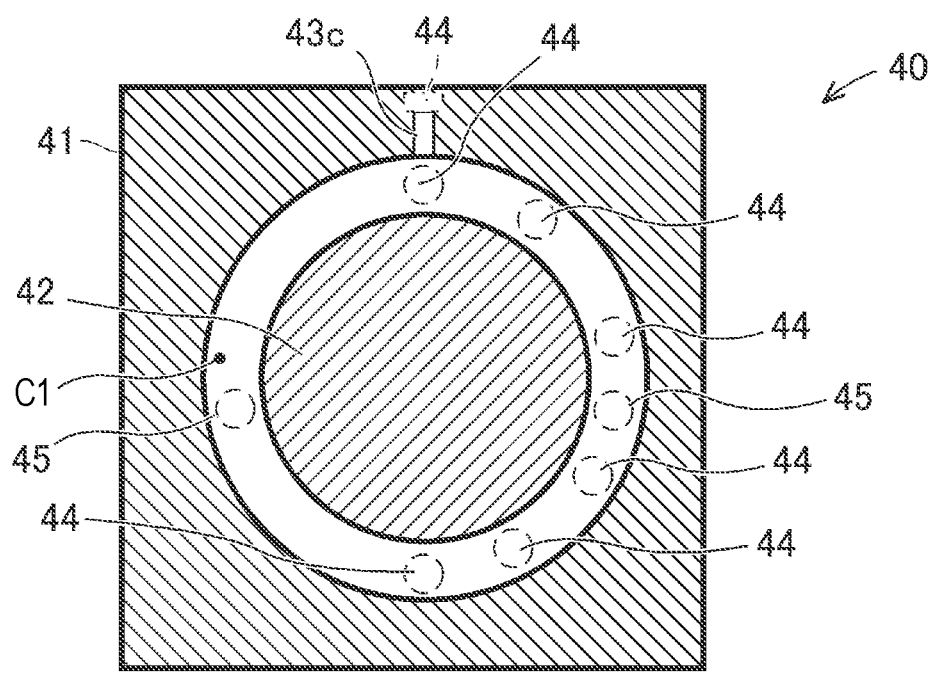
FIG. 3 is a sectional view of the die taken along line III-III in FIG. 2.

A detailed structure of the die 40 will be described with reference to FIGS. 2 and 3. Although the die 40 is what is called a multicavity die and is formed with plural cavities C1. However, to simplify the drawings, FIGS. 2 and 3 show only one cavity C1. In this example, the mold product produced by the molding machine 2 is a holder to be used in a constant velocity joint. Thus, the mold product is ring-shaped and the cavity C1 has a ring shape that conforms to the shape of the holder. The shape of each of the mold product and the cavity C1 may be a shape other than a ring shape, such as a C-shape or a rectangular frame shape.

The supply passage 43 has a sprue 43*a*, a runner 43*b*, and a gate 43*c*. The sprue 43*a* is a passage that is supplied with molten material from the nozzle 34. The runner 43*b* is a passage that branches off the sprue 43*a* and the molten material supplied to the sprue 43*a* flows into the runner 43*b*. The gate 43*c* is a passage that guides the molten material that has flown into the runner 43*b* to the cavity C1. The passage sectional area of the gate 43*c* is smaller than that of the runner 43*b*. In actuality, the die 40 is formed with runners 43*b* and gates 43*c* in the same number as the cavities C1 and molten material that has been supplied to the sprue 43*a* is supplied to the cavities C1 via the runners 43*b* and the gates 43*c*, respectively.

Where the cavity C1 is ring-shaped and the first die 41 is formed with one gate 43*c*, molten material flows into the cavity C1 from the gate 43*c* and flows through the cavity C1 so as to take a circumferential, ring-shaped route. That is, in the cavity C1, molten material first flows to a portion that is close to the gate 43*c* and finally flows to a portion that is most distant from the gate 43*c*.

In this example, the die 40 is provided with the plural pressure sensors 44 for detecting pressures that they receive from molten material existing in the supply passage 43. For example, the pressure sensors 44 are provided in the cavity C1 around a position most distant from the gate 43c and around a position close to the gate 43c. Pressure sensors 44 may be provided in the sprue 43a and the runner 43b. Each pressure sensor 44 may be either a contact sensor or a non-contact sensor.

The die 40 is also provided with the temperature sensors 45 for detecting temperatures of molten material existing in the supply passage 43. Like the pressure sensors 44, the temperature sensors 45 are preferably provided in the cavity C1 and may be provided in the sprue 43a or the runner 43b. Plural temperature sensors 45 may be provided like the pressure sensors 44.

4. Configuration of the Molding Conditions Determination Assist Device 3

The configuration of the molding conditions determination assist device 3 will be described with reference to FIGS. 4-8. For example, the molding conditions determination assist device 3 is equipped with a computing device having a processor, a storage device, an interface, etc. and an input device and an output device that can be connected to the interface of the computing device. For example, the output device may be configured so as to include a display device. Alternatively, the computing device, the input device, and the output device may constitute a single unit without intervention of an interface. A physical server or a cloud server may be employed as part of the computing device and part of the storage device.

Figure 4:
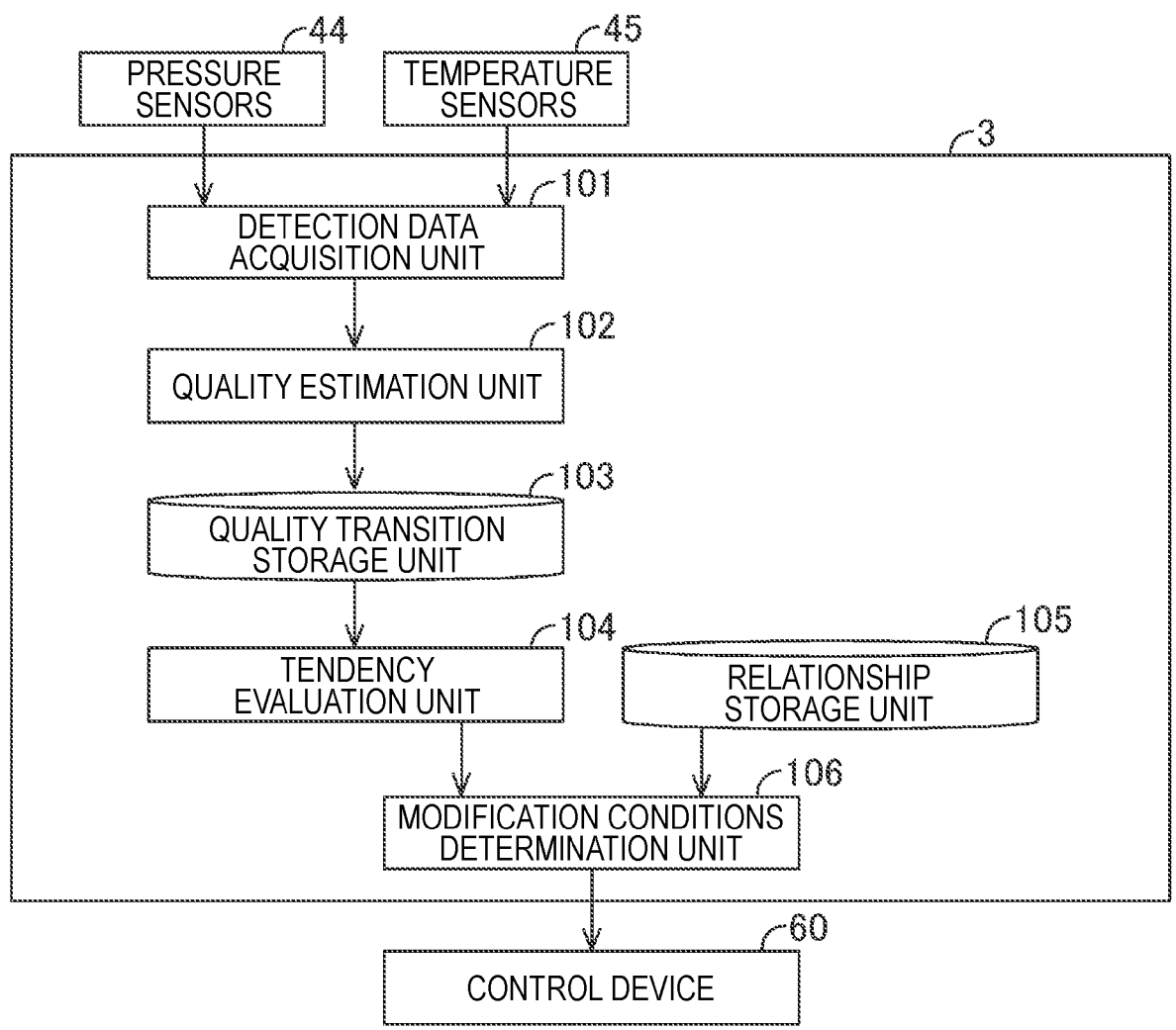
FIG. 4 is a functional block diagram of a molding conditions determination assist device.

As shown in FIG. 4, the molding conditions determination assist device 3 is equipped with a detection data acquisition unit 101, a quality estimation unit 102, a quality transition storage unit 103, a tendency evaluation unit 104, a relationship storage unit 105, and a modification conditions determination unit 106.

The detection data acquisition unit 101 acquires detection data detected during molding by the sensors 44 and 45 which are attached to the molding machine 2. That is, the items of detection data acquired by the detection data acquisition unit 101 are at least one of a pressure that the die 40 receives from molten material in the supply passage 43 and a temperature of molten material in the supply passage 43.

FIG. 5 shows example detection data detected by a pressure sensor 44. In FIG. 5, time T1 is a filling start time, time T2 is a filling end time as well as a holding start time, time T3 is a holding end time as well as a cooling start time, and time T4 is a cooling end time as well as a die opening time. That is, the injection and filling step is from time T1 to time T2, the holding step is from time T2 to time T3, and the cooling step is from time T3 to time T4. In FIG. 5, a maximum holding pressure Pmax is a maximum pressure in the holding step, a holding area Sa is an integrated value of pressure in the holding step, and a cooling area Sb is an integrated value of pressure in the cooling step.

The quality estimation unit 102 estimates quality of a mold product by machine learning on the basis of detection data acquired by the detection data acquisition unit 101. For example, the quality estimation unit 102 estimates a numerical value of one or plural quality items of a mold product. The quality items of a mold product are at least one of the mass, dimension, and void volume of the mold product.

The quality estimation unit 102 generates, in advance, learned models by learning relationships between the detection data and the quality of a mold product by machine learning. The learned models are generated for respective quality items. The quality estimation unit 102 is stored with the learned models and estimates quality of a mold product using newly acquired detection data and the learned models.

The quality transition storage unit 103 accumulates pieces of quality information of mold products estimated by the quality estimation unit 102 and stores quality transitions of those plural mold products. The quality transition is information that pieces of quality information of plural mold products are arranged in order of molding, such as data (mass data) shown in FIG. 6. In FIG. 6, symbol "Std" represents prescribed standard quality and symbols "Thmax and Thmin" represent an upper limit value and a lower limit value of an allowable quality range, respectively. That is, a mold product whose quality is between the upper limit value Thmax and the lower limit value Thmin is a good product and a mold product whose quality is out of this range is a defective product. Ideally, even good products should have the prescribed standard quality Std.

In FIG. 6, in an initial stage of molding most of mold products show quality values that are close to the standard quality Std excluding a mold product whose quality value is larger than the upper limit value Thmax (a sudden abnormality indicated by symbol "A2"). That is, the mold products produced in the initial stage of molding show values around the standard quality Std (indicated by symbol "A1" in FIG. 6) excluding the mold product of the sudden abnormality. As the molding is continued thereafter, the quality of a mold product departs from the standard quality Std gradually and comes to show values that are larger than the standard quality Std by +N % (indicated by symbol "A3" in FIG. 6).

The tendency evaluation unit 104 evaluates quality change tendencies with respect to the standard quality Std on the basis of the quality transitions stored in the quality transition storage unit 103. As shown in FIG. 7, the tendency evaluation unit 104 evaluates, as quality change tendencies, quality deviations from the standard quality Std and degrees of quality variation of plural mold products for plural respective quality items.

The number of quality transition mold products used for evaluation of quality change tendencies by the tendency evaluation unit 104 is set in advance. That is, the tendency evaluation unit 104 calculates quality deviations of mold products of the preset number. For example, the tendency evaluation unit 104 calculates, as quality deviations, deviations (absolute values or relative values) of quality average values of those mold products from the standard quality Std. The term "degrees of variation" means to what extents the quality items of mold products of the preset number vary (or the quality items of mold products of the preset number are stable). For example, the degrees of variation may be standard deviations, variances, or the like.

For example, as shown in FIG. 7, the tendency evaluation unit 104 evaluates that the mass has a deviation "+2.2%" and a degree of variation "stable," the dimension has a deviation "+0.3%" and a degree of variation "stable," and the void volume has a deviation "−0.5%" and a degree of variation "stable."

Furthermore, the tendency evaluation unit 104 produces an evaluation result that the quality transition A1 shown in FIG. 6 has a quality change tendency that the quality is around the standard quality Std stably. In evaluating the quality transition A1 shown in FIG. 6, the tendency evaluation unit 104 excludes the mold product that showed a quality change of a sudden abnormality (indicated by symbol "A2"). In this case, the tendency evaluation unit 104 produces an evaluation result that the deviation of the quality item concerned from the standard quality Std is equal to "0.1%" and the degree of variation is "stable." The sudden abnormality is judged irrelevant to the molding conditions because the quality of mold products returned to normal values after the sudden abnormality. Thus, evaluation is made excluding the sudden abnormality.

The tendency evaluation unit 104 produces an evaluation result that the quality transition A3 shown in FIG. 6 has a quality change tendency that the quality item concerned is deviated from the standard quality Std by +N % stably. In this case, the tendency evaluation unit 104 produces an evaluation result that the deviation of the quality item concerned from the standard quality Std is equal to "+N %" and the degree of variation is "stable."

The relationship storage unit 105 is stored with relationships between the quality change tendencies and the modification amounts of molding conditions for returning the quality to the standard quality. For example, as shown in FIG. 8, the relationship storage unit 105 is stored with, for each quality item, a matrix showing a relationship between the deviation level and the modification amount of each molding condition. For example, six deviation levels are set for each of the mass, dimension, and void volume. Modification target molding conditions are at least one of an injection rate, a holding pressure, a holding time, a holding die temperature, a cooling time, etc.

To what extent each quality item is related to the molding conditions and a relationship between the deviation of each quality item and the modification amounts of the molding conditions can be derived using machine learning. That is, relationships to be stored in the relationship storage unit 105 can be generated by machine learning. Naturally, such relationships may be set on the basis of experiments, past experiences, etc. rather than by machine learning.

The modification conditions determination unit 106 determines modification amounts of the molding conditions on the basis of quality change tendencies obtained by the tendency evaluation unit 104 and the relationships stored in the relationship storage unit 105. For example, the modification conditions determination unit 106 determines levels that are closest to deviations obtained by the tendency evaluation unit 104 in the matrix relationships shown in FIG. 8 and employs modification amounts of the molding conditions corresponding to each determined level. For example, as shown in FIG. 7, when the mass deviation is "+2.2%," a mass deviation level "+2%" in the matrix shown in FIG. 8 is selected.

The modification conditions determination unit 106 determines modification amounts of the molding conditions for each of the plural quality items. The modification conditions determination unit 106 determines a final modification amount of each molding condition on the basis of plural modification amounts of the molding condition. In this case, for example, the modification conditions determination unit 106 may employ, as a final modification amount, the sum of the plural modification amounts or the sum of the plural modification amounts multiplied by weights for the respective quality items.

Furthermore, the modification conditions determination unit 106 outputs the final correction amounts to the control device 60 of the molding machine 2 and thereby causes the molding conditions for the next mold product to be modified by the modification amounts. The control device 60 performs molding for the next mold product under the modified molding conditions. As a result, the quality of the mold product produced under the modified molding conditions can be made closer to the standard quality Std.

5. Advantageous Effects of Molding Conditions Determination Assist Device 3

Advantageous effects of the above-described molding conditions determination assist device 3 will be described below. The quality transition storage unit 103 accumulates pieces of quality information of mold products estimated by machine learning, and stores quality transitions of those plural mold products. Each quality transition is pieces of information that pieces of quality information of plural mold products are arranged in order of molding. Thus, the tendency evaluation unit 104 can evaluate a quality change tendency on the basis of a quality transition of plural consecutive mold products.

In particular, the tendency evaluation unit 104 evaluates quality change tendencies with respect to the prescribed standard quality Std. For example, the tendency evaluation unit 104 can generate a quality change tendency that a state that a quality item is deviated from the standard quality Std is continuing, a quality change tendency that a quality item is varying in a quality allowable range including the prescribed standard quality Std, or the like.

Furthermore, the relationships between the quality change tendencies and the modification amounts of the molding conditions are stored in the relationship storage unit 105 in advance. These relationships have been set using know-how of skilled workers, output results of machine learning, experimental results, etc. The modification conditions determination unit 106 determines modification amounts of the molding conditions on the basis of newly evaluated quality change tendencies and the relationships stored in the relationship storage unit 105.

The relationships stored in the relationship storage unit 105 relate to the modification amounts of the molding conditions to be used for returning the quality to the prescribed standard quality Std. Thus, the quality of a mold product to be produced next can be made closer to the standard quality Std if the molding conditions of the molding machine 2 are modified according to modification amounts of the molding conditions determined by the modification conditions determination unit 106.

That is, even in a case that the quality of a mold product is varied by an external factor such as an ambient temperature, the molding conditions can be modified so that the quality of a mold product becomes the prescribed standard quality Std by recognizing quality change tendencies. Thus, not only a skilled worker but also an unskilled worker can modify the molding conditions so that a mold product has good quality.

6. Learning Phase in Quality Estimation

As described above, the quality estimation unit 102 estimates quality by machine learning. The quality estimation unit 102 is stored with the learned models that were generated in advance. Generation of learned models, that is, an example learning phase, will be described below.

First, detection data of plural mold products are acquired. Feature quantities of the detection data are extracted on the basis of the detection data. For example, to extract feature quantities, a maximum holding pressure Pmax in the holding step, a pressure variation in the holding step, a holding area Sa (see FIG. 5), an actual holding time (a holding time obtained on the basis of pressure data), a pressure change rate (pressure differentiation value) at a start of the holding step, etc. are used that are obtained from pressure data detected by the pressure sensors 44. To extract feature quantities, a cooling area Sb (see FIG. 5), a pressure change rate (pressure differentiation value) in the cooling step, etc. are also used that are obtained from the pressure data.

Furthermore, to extract feature quantities, a maximum temperature in the holding step, a temperature variation in the holding step, a temperature area (temperature×time) in the holding step, a cooling area (temperature×time) in the cooling step, a temperature change rate (differentiation value) in the cooling step, etc. are used that are obtained from temperature data detected by the temperature sensors 45. Since plural pressure sensors 44 and plural temperature sensors 45 are provided in the die 40, the above kinds of information obtained from each sensor are used for extraction of feature quantities.

Plural kinds of information as described above are acquired from each of plural mold products. A maximum value, a minimum value, an average, a variance, etc. of the plural mold products are calculated for each kind of information and employed as feature quantities.

On the other hand, quality items of each of the plural mold products are measured using external measuring instruments etc. For example, a mass, a dimension, a void volume, etc. are measured as quality items. Learned models are generated by performing machine learning using the feature quantities as explanatory variables and the quality items as object variables. The learned models thus generated are models capable of outputting quality items using feature quantities of detection data as inputs.

Although the above-described learned models employ the feature quantities as explanatory variables, there exist learned models that employ detection data themselves, rather than the feature quantities, as explanatory variables and can output quality items as object variables.

7. Learning Phase for Determination of Relationships

For example, relationships between the quality deviations and the modification amounts to be stored in the relationship storage unit 105 can be generated using machine learning. A case of generating such relationships using machine learning will be described below.

7-1. First Example

Figure 9:
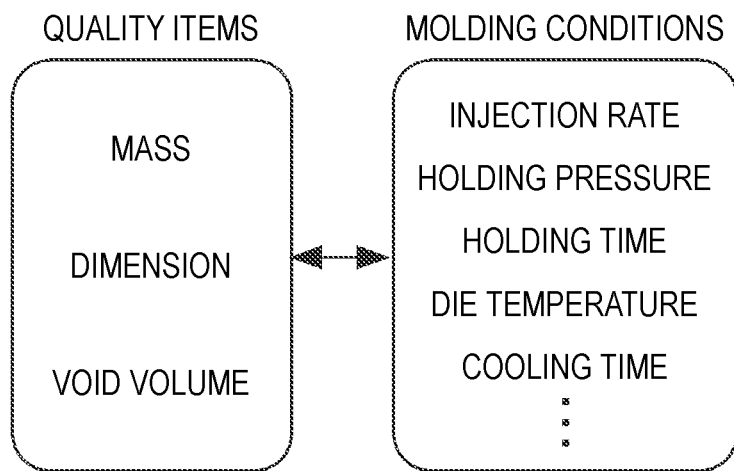
FIG. 9 is a diagram showing a first example learning phase for determination of relationships between the quality deviations and the modification amounts.

A first example learning phase will be described with reference to FIG. 9. In the first example learning phase, as shown in FIG. 9, relationships between the quality items and the molding conditions are generated directly by machine learning.

For example, quality values of the respective quality items and values of the molding conditions are input and to what degrees (degrees of contribution and degrees of influence) the molding conditions influence the quality items are acquired by machine learning. Furthermore, to what degrees the modification amounts of the molding conditions influence the quality items may also be acquired. As a result, information indicating relationships between the quality items and the molding conditions and, furthermore, information indicating relationships between the quality items and the modification amounts of the molding conditions can be obtained.

A person determines relationships that are expressed in the form of matrices as shown in FIG. 8 on the basis of the relationship information obtained by the machine learning. Naturally, matrices as shown in FIG. 8 can be generated by machine learning.

7-2. Second Example

Figure 10:
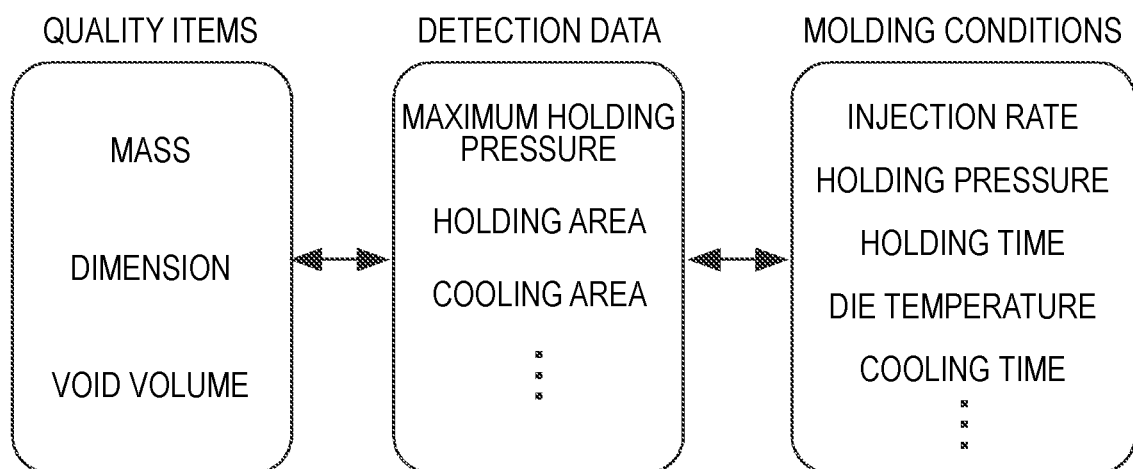
FIG. 10 is a diagram showing a second example learning phase for determination of relationships between the quality deviations and the modification amounts.

A second example learning phase will be described with reference to FIG. 10. In the second example learning phase, as shown in FIG. 10, relationships between the quality items and the molding conditions are generated indirectly by machine learning.

In the first example shown in FIG. 9, relationships between the quality items and the molding conditions are generated directly by machine learning. However, there may occur a case that relationships between the quality items and the molding conditions cannot be obtained directly. It is apparent that molding conditions determine states in molding which then determine quality. That is, it can be said that molding conditions and quality have certain relationships via states in molding. For example, the states in molding are a maximum holding pressure Pmax, a holding area Sa, a cooling area Sb, etc.

In view of the above, first, quality values of the respective quality items and feature quantities (feature quantities obtained from a maximum holding pressure etc.) of detection data are input and to what degrees (degrees of contribution and degrees of influence) the feature quantities of the detection data influence the quality items are acquired by machine learning. Furthermore, to what degrees the feature quantities of the detection data influence the quality items may also be acquired. As a result, information indicating relationships between the quality items and the feature quantities of the detection data and, furthermore, information indicating relationships between the quality items and the modification amounts of the feature quantities of the detection data can be obtained.

Next, feature quantities of the detection data and values of the molding conditions are input and to what degrees (degrees of contribution and degrees of influence) the molding conditions influence the feature quantities of the detection data are acquired. Furthermore, to what degrees the modification values of the molding conditions influence the feature quantities of the detection data may also be acquired. As a result, information indicating relationships between the feature quantities of the detection data and the molding conditions and, furthermore, information indicating relationships between the feature quantities of the detection data and the modification amounts of the molding conditions can be obtained.

Then a person determines relationships that are expressed in the form of matrices as shown in FIG. 8 on the basis of the information indicating the relationships between the quality items and the feature quantities of the detection data, the information indicating the relationships between the feature quantities of the detection data and the molding conditions, etc. Naturally, matrices as shown in FIG. 8 can be generated by machine learning.

8. Operation Timing of Molding Machine System 1

8-1. Basics

The operation timing of the molding machine system 1, in particular, the operation timing between the process executed by the molding machine 2 and the process executed by the molding conditions determination assist device 3, will be described with reference to FIG. 11. It is assumed that the molding machine 2 produces mold products continuously. To simplify the description, a description will be made of a case that a second mold product is produced after a first mold product.

Figure 11:
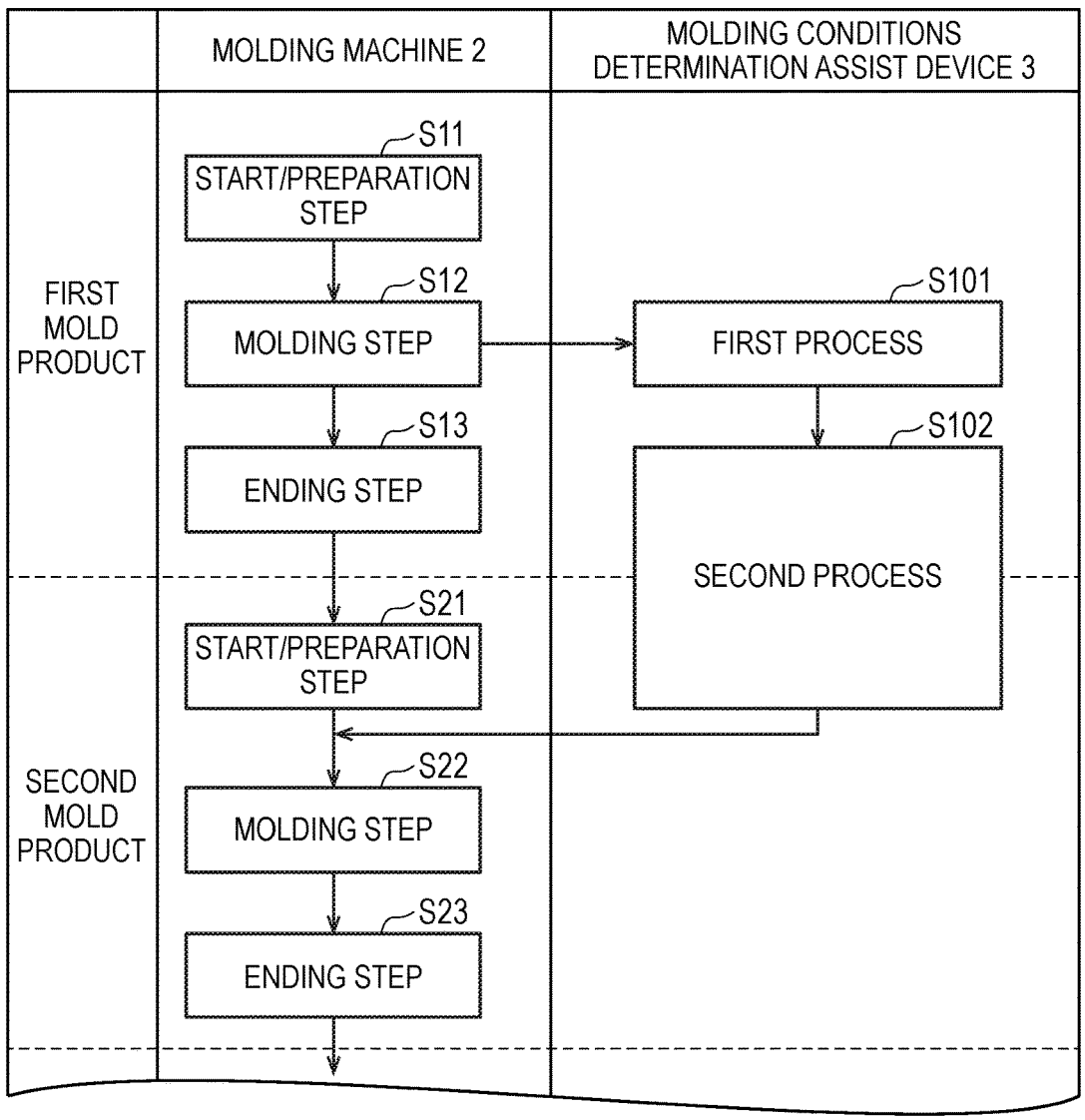
FIG. 11 is a chart showing operation timing between a process executed by the molding machine and a process executed by the molding conditions determination assist device in which time elapses downward.

As shown in FIG. 11, at step S11, the molding machine 2 executes a start/preparation step for a first mold product. For example, the start/preparation step includes an amount measuring step and a clamping step. At step S12, the molding machine 2 executes a molding step to produce a first mold product. The molding step includes an injection and filling step, a holding step, and a cooling step. At step S13, the molding machine 2 executes an ending step for the first mold product. For example, the ending step includes a release and ejection step.

Where the molding conditions determination assist device 3 uses detection data detected by the pressure sensors 44 and the temperature sensors 45 in an initial part (immediately after die opening) of the release and ejection step, the initial part of the release and ejection step may be included in the molding step.

After molding the first mold product, the molding machine 2 starts a process for molding a second mold product. First, at step S21, the molding machine 2 executes a start/preparation step for a second mold product. At step S22, the molding machine 2 executes a molding step to produce a second mold product. At step S23, the molding machine 2 executes an ending step for the second mold product.

On the other hand, the molding conditions determination assist device 3 operates parallel with the molding machine 2. More specifically, the molding conditions determination assist device 3 executes a first process S101 in parallel with detection of data by the pressure sensors 44 and the temperature sensors 45 in the molding of the first mold product and executes a second process S102 in parallel with the ending step S13 for the first mold product and the start/preparation step S21 for the second mold product. That is, the second process S102 is executed parallel with a preparation step of the molding machine 2 from the end of the molding step S12 for the first mold product to the start of the molding step S22 for the second mold product (i.e., the ending step S13 for the first molding product and the start/preparation step S21 for the second mold product).

The first process S101 includes at least a process executed by the detection data acquisition unit 101. The second process S102 includes at least a process executed by the modification conditions determination unit 106. The modification conditions determination unit 106 determines modification amounts of the molding conditions for the second mold product. That is, in the molding step S22 for the second mold product, the molding machine 2 uses molding conditions as modified using data obtained in the molding step S12 for the first mold product. In this manner, modification amounts of the molding conditions are determined in one molding cycle for a mold product. Since molding information obtained immediately before can be used in determining modification amounts of the molding conditions, the modification amounts of the molding conditions can be made suitable for the current situation with higher accuracy.

8-2. First Example

A first example process executed by the molding conditions determination assist device 3 is as follows. The detection data acquisition unit 101 operates in the first process S101. On the other hand, the quality estimation unit 102, the tendency evaluation unit 104, and the modification conditions determination unit 106 operate in the second process S102.

8-3. Second Example

A second example process executed by the molding conditions determination assist device 3 is as follows. The detection data acquisition unit 101 and the quality estimation unit 102 operate in the first process S101. On the other hand, the tendency evaluation unit 104 and the modification conditions determination unit 106 operate in the second process S102.

9. Example Configurations of Molding Machine System 1

9-1. First Example

Figure 12:
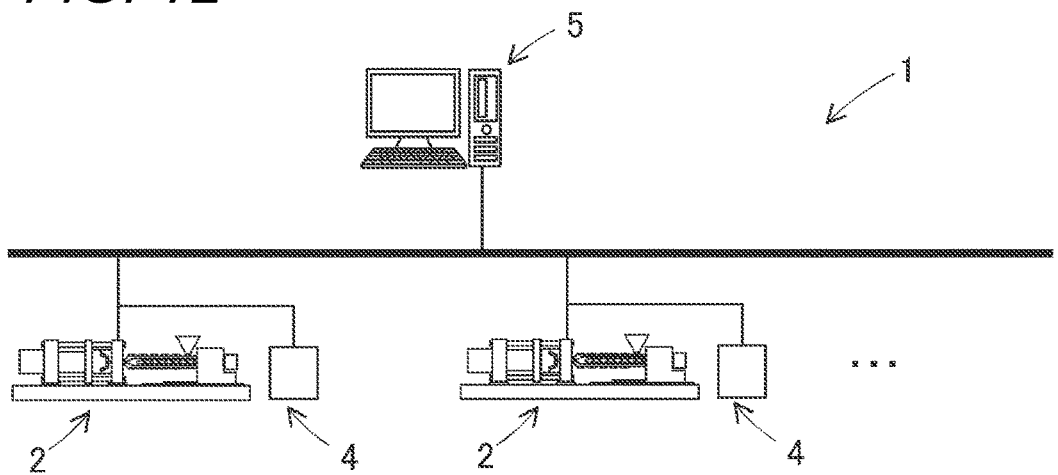
FIG. 12 is a diagram showing an example configuration of a molding machine system.

The configuration of a first example molding machine system 1 will be described with reference to FIG. 12. As shown in FIG. 12, the molding machine system 1 is equipped with plural molding machines 2, edge computers 4 which are integrated with the respective molding machines 2, and a server 5 which constitutes the same network with the plural molding machines 2. Each edge computer 4 may either be part of or be separate from the associated molding machine 2.

The edge computers 4 and the server 5 constitute a molding conditions determination assist device 3. Each edge computer 4 is equipped with the detection data acquisition unit 101. The server 5 is equipped with the quality estimation unit 102, the quality transition storage unit 103, the tendency evaluation unit 104, the relationship storage unit 105, and the modification conditions determination unit 106.

That is, the server 5 receives detection data acquired by the detection data acquisition unit 101 from each edge computer 4 that is separate from or is incorporated in the associated molding machine 2. The server 5 determines modification amounts of the molding conditions on the basis of the received information and transmits the determined modification amounts of the molding conditions to the molding machine 2.

In this case, the server 5 can accumulate information relating to the plural molding machines 2. Furthermore, the quality estimation unit 102, the tendency evaluation unit 104, and the modification conditions determination unit 106 can perform processing at high speed by having the server 5 equipped with a processor capable of high-speed processing. On the other hand, the cost of each edge computer 4 can be made low because it need not be of a high-level specification.

9-2. Second Example

As in the first example, a second example molding machine system 1 is equipped with plural molding machines 2, edge computers 4 which are connected to the respective molding machines 2, and a server 5 which constitutes the same network with the plural molding machines 2.

Each edge computer 4 is equipped with the detection data acquisition unit 101 and the quality estimation unit 102. The server 5 is equipped with the quality transition storage unit 103, the tendency evaluation unit 104, the relationship storage unit 105, and the modification conditions determination unit 106. That is, the server 5 receives quality of a mold product estimated by the quality estimation unit 102 from each edge computer 4 that is separate from or is incorporated in the associated molding machine 2. The server 5 determines modification amounts of the molding conditions on the basis of the received information and transmits the determined modification amounts of the molding conditions to the molding machine 2.

9-3. Third Example

In a third example molding machine system 1, a server 5 has all the functions. In this case, no edge computers 4 are necessary. The detection data acquisition unit 101 of the server 5 receives detection data detected by the sensors 44 and 45 from each molding machine 2. The modification conditions determination unit 106 of the server 5 transmits modification amounts of the molding conditions to the molding machine 2.

A resin state estimation device and a molding conditions determination assist device according to a second embodiment will be described below. However, the concept of the present disclosure is not limited to the second embodiment and various design changes can be made without departing from the spirit and scope of the disclosure.

1. Application Targets

The resin state estimation device and the molding conditions determination assist device are applied to a molding method for producing a mold product by supplying molten material obtained by melting molding material (resin) into the cavity of a die of an injection molding machine. Example resins as molding materials are a thermoplastic resin such as polyamide itself and a reinforced resin obtained by adding a bulking agent to a thermoplastic resin base material. An example bulking agent is a micrometer-size filler or a nanometer-size filler. Example fillers are glass fiber and carbon fiber.

2. First Example Molding Machine System 501A

Figure 13:
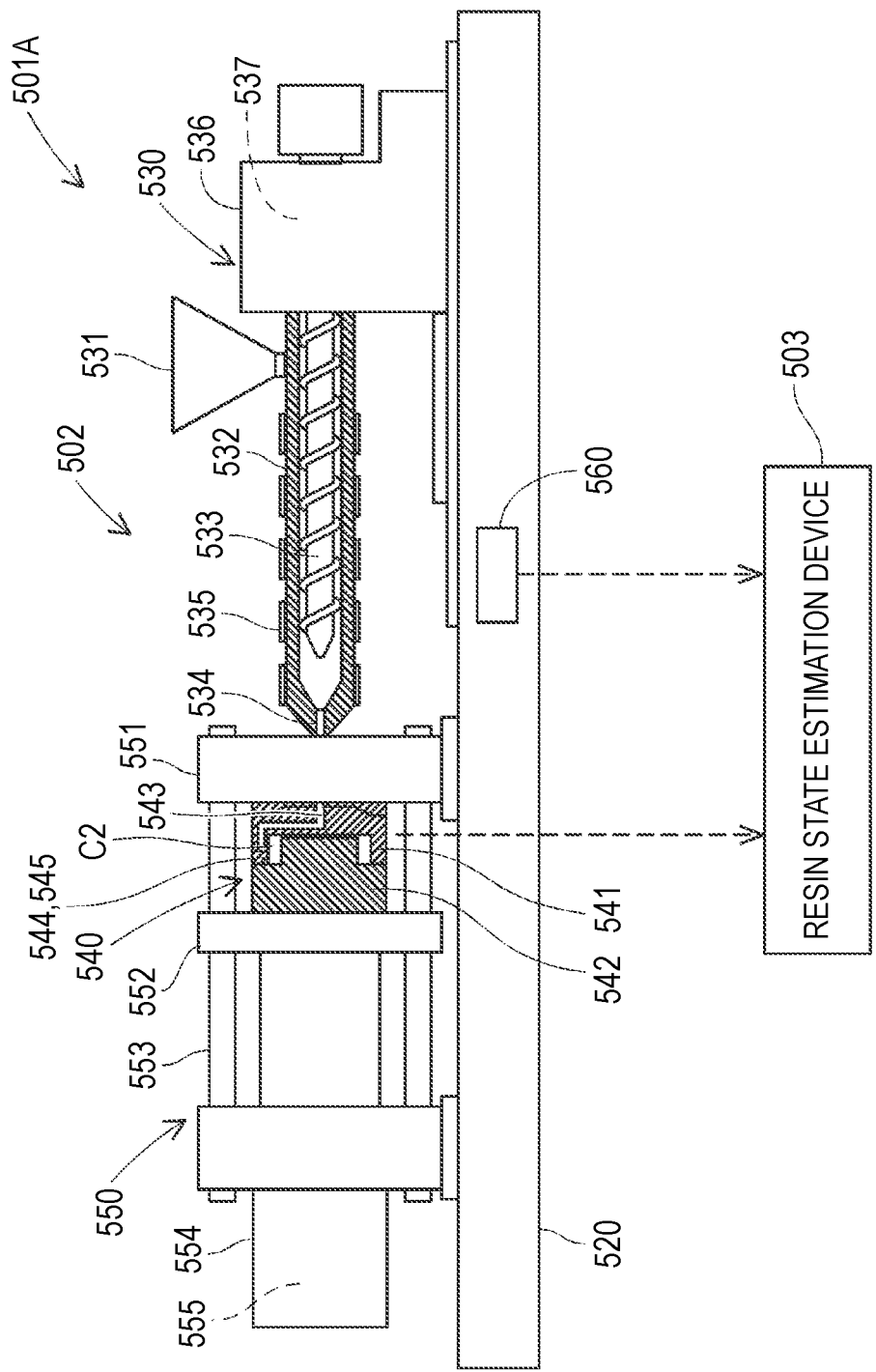
FIG. 13 is a diagram showing an overall configuration of a first example molding machine system according to a second embodiment.

A first example molding machine system 501A including a molding conditions determination assist device 503 will be described with reference to FIG. 13. As shown in FIG. 13, the molding machine system 501A is equipped with an injection molding machine (hereinafter referred to as a "molding machine") 502 and a resin state estimation device 503.

The molding machine 502 produces a resin mold product by molding. The resin state estimation device 503 estimates a melting state of resin in the cavity C2 of a die 540 of the molding machine 502. For example, the estimated resin melting state is used for determining molding conditions of the molding machine 502.

The resin state estimation device 503 may be either a device that is separate from the molding machine 502 or a built-in device of the molding machine 502. And the resin state estimation device 503 may be such that part of it is incorporated in the molding machine 502 and the remaining part is implemented as a separate device. Where all or part of the resin state estimation device 503 is separate from the molding machine(s) 502, the separate part may be connected to either only a single molding machine 502 or plural molding machines 502. In the latter case, the separate part of the resin state estimation device 503 and the plural molding machines 502 constitute the same network and can communicate with each other.

3. Molding Machine 502

3-1. Configuration of Molding Machine 502

The configuration of the molding machine 502 will be described with reference to FIG. 13. The molding machine 502 is mainly equipped with a bed 520, an injection machine 530, the die 540, a clamping device 550, and a control device 560.

The injection machine 530 is mounted on the bed 520. The injection machine 530 is a machine for melting molding material (resin) and supplying resulting molten material to the cavity C2 of the die 540 by applying pressure to the molten material. The injection machine 530 is mainly equipped with a hopper 531, a heating cylinder 532, a screw 533, a nozzle 534, a heater 535, a drive device 536, and an injection machine sensor 537.

The hopper 531 is an inlet of pellets (grainy molding material) that are molding material (base material). The heating cylinder 532 applies pressure to molten material obtained by melting, by heating, the pellets that are input to the hopper 531. The heating cylinder 532 is disposed so as to be movable with respect to the bed 520 in the axial direction of the heating cylinder 532. The screw 533 is disposed inside the heating cylinder 532 so as to be rotatable and movable in the axial direction. The nozzle 534, which is an injection outlet provided at the tip of the heating cylinder 532, supplies molten material into the die 540 from inside the heating cylinder 532 when the screw 533 is moved in the axial direction.

Disposed, for example, outside the heating cylinder 532, the heater 535 heats pellets existing inside the heating cylinder 532. For example, the drive device 536 moves the heating cylinder 532 in the axial direction and rotates the screw 533 and moves it in the axial direction. The injection machine sensor 537 is a generic term of sensors for acquiring a molten material storage amount, a holding pressure, a holding time, an injection rate, a state of the drive device 536, and other parameters. The injection machine sensor 537 may acquire not only the above kinds of information but also various other kinds of information.

The die 540 is equipped with a fixed-side first die 541 and a movable-side second die 542. In the die 540, a cavity C2 is formed between the first die 541 and the second die 542 by clamping the first die 541 and the second die 542 together. The first die 541 has a supply passage 534 (sprue, runner, and gate) for guiding, to the cavity C2, molten material supplied from the nozzle 534. The die 540 is further equipped with pressure sensors 544 and temperature sensors 545. The pressure sensors 544 detect pressures received from the molten material existing in the supply passage 543. The temperature sensors 545 detects, directly, a temperature of the molten material existing in the supply passage 543.

The clamping device 550 is mounted on the bed 520 so as to be opposed to the injection machine 530. The clamping device 550 performs an operation of opening/closing the die 540 and prevents the die 540 from being opened by pressure of molten material injected into the cavity C2 in a state that the die 540 is clamped.

The clamping device 550 is equipped with a fixed plate 551, a movable plate 552, die bars 553, a drive device 554, and a clamping device sensor 555. The first die 541 is fixed to the fixed plate 551. Capable of coming into contact with the nozzle 534 of the injection machine 530, the fixed plate 551 guides molten material ejected from the nozzle 534 to the die 540. The second die 542 is fixed to the movable plate 552. The movable plate 552 can come closer to and go away from the fixed plate 551. The die bars 553 support the movable plate 552 being moved. Being, for example, a cylinder device, the drive device 554 moves the movable plate 552. The clamping device sensor 555 is a generic term of sensors for acquiring a clamping force, a die temperature, a state of the drive device 554, and other parameters.

The control device 560 controls the drive device 536 of the injection machine 530 and the drive device 554 of the clamping device 550. For example, the control device 560 acquires various kinds of information from the injection machine sensor 537 and the clamping device sensor 555 and controls the drive device 536 of the injection machine 530 and the drive device 554 of the clamping device 550 so that they operate according to operation command data.

3-2. Molding Method

A molding method for forming a mold product by the molding machine 502 will be described below. In the molding method of the molding machine 502, an amount measuring step, a clamping step, an injection and filling step, a holding step, a cooling step, and a release and ejection step are executed sequentially in one cycle. These steps are executed sequentially again in producing the next mold product. The amount measuring step and the clamping step constitute a start/preparation step, the injection and filling step, the holding step, and the cooling step make up a molding step, and the release and ejection step is an ending step. Alternatively, an initial part (to immediately after die opening) of the release and ejection step may be included in the molding step, in which case the ending step includes only the latter part of the release and ejection step.

In the amount measuring step, molten material is stored between the tip of the screw 533 and the nozzle 534 inside the heating cylinder 532 while pellets are melted by heating by the heater 535 and shearing friction heat generated by rotation of the screw 533. Since the screw 533 retreats as the storage amount of molten material increases, a storage amount of molten material is measured on the basis of a retreat position of the screw 533.

In the clamping step which follows the amount measuring step, clamping is performed in which the first die 541 and the second die 542 are combined together by moving the movable plate 552. Furthermore, the heating cylinder 532 is moved in the axial direction so that it comes closer to the clamping device 550 and the nozzle 534 is connected to the fixing plate 551 of the clamping device 550. Subsequently, in the injection and filling step, the screw 533 is moved toward the nozzle 534 by a prescribed pushing force in a state that the rotation of the screw 533 is stopped, whereby molten material is injected into the die 540 at a high pressure and fills up the die 540. The process moves to the holding step as soon as the cavity C2 is filled with molten material.

In the holding step, holding processing is performed in which a prescribed pressure (holding pressure) is applied to the molten material in the cavity C2 for a prescribed time by pressing molten material further into the cavity C2 that is already filled with molten material. More specifically, the prescribed holding pressure is applied to the molten material by applying a prescribed pushing force to the screw 533.

After the holding processing has been performed at the prescribed holding pressure for the prescribed time, the process moves to the cooling step. In the cooling step, processing of decreasing the holding pressure by stopping the pushing-in of molten material is performed and the die 540 is cooled, whereby the molten material that has been supplied to the die 540 solidifies. Finally, in the release and ejection step, the second die 542 is separated from the first die 541 and a mold product is taken out.

4. Basics of Estimation of Resin Melting State

The basics of estimation of a melting state of resin in the cavity C2 will be described with reference to FIGS. 14-17. In this example, resin melting states are classified into three groups and estimation of a resin melting state means estimation of a resin melting state group.

Figure 14:
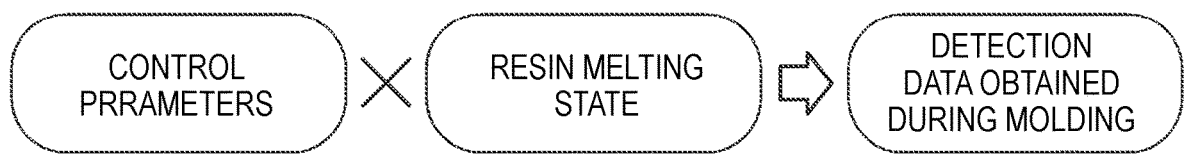
FIG. 14 shows a relationship between control parameters, a resin melting state, and detection data.

FIG. 14 shows that control parameters and a resin melting state influence detection data obtained during molding. The resin melting state depends on the components of a molding material (base material). For example, variable factors of components of a molding material (base material) include a water content, lengths of reinforcement fibers, a proportion of reinforcement fibers, the molecular weights of main components, etc. As described above, the melting state of resin in the cavity C2 influences detection data obtained during molding.

More specifically, detection data that are detected during molding by the sensors 544 and 545 attached to the molding machine 502 are considered to be influenced by control parameters that are used for control in the molding machine 502 and a melting state of resin in the cavity C2. In other words, a resin melting state is influenced by detection data and control parameters.

Figure 15:
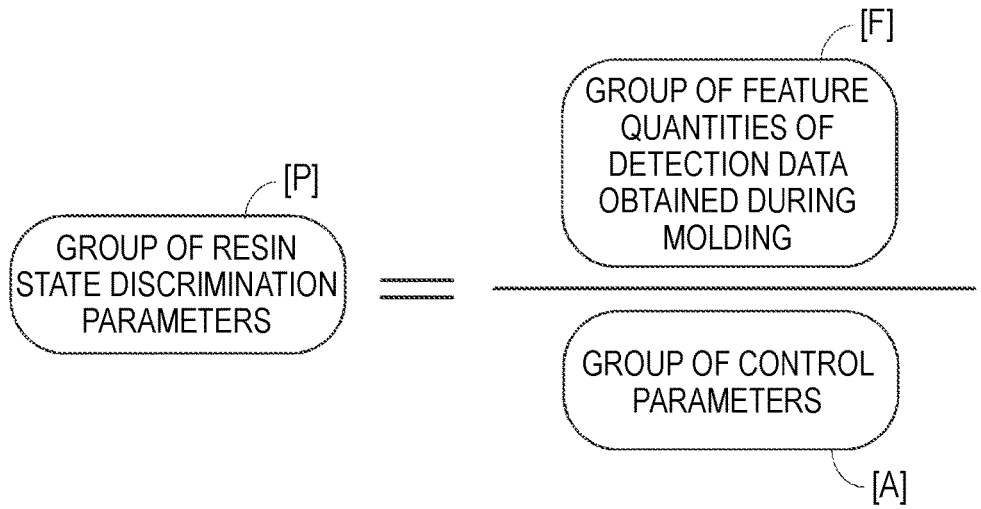
FIG. 15 shows a formula indicating how resin state discrimination parameters are expressed.

FIG. 15 shows a formula (having values) representing the above relationship. In FIG. 15, information indicating values of detection data that are detected during molding is a feature quantity group [F] consisting of plural feature quantities relating to the detection data. The feature quantities are statistical parameters (maximum value, minimum value, average, variance, maximum differentiation value, minimum differentiation value, integration value, etc.) of detection data of the pressure sensor 544 in each of molding steps (injection and filling step, holding step, cooling step, etc.) and such statistical parameters of detection data of the temperature sensor 545 in each of those molding steps. Where plural pressure sensors 544 and plural temperature sensors 545 are provided, the feature quantities are statistical parameters of detection data of each of the pressure sensors 544 and each of the individual temperature sensors 545. A number of feature quantities can be obtained in this manner and these plural kinds of feature quantities are together referred to as a feature quantity group [F].

Figure 16:
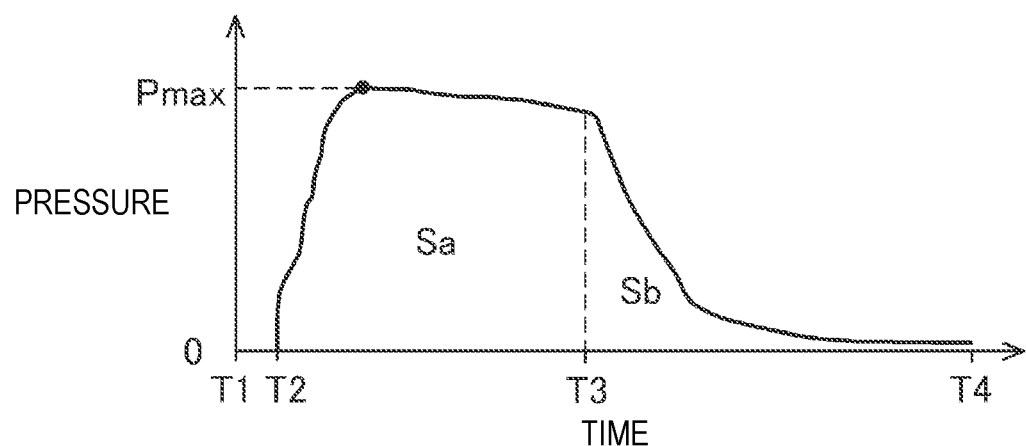
FIG. 16 is a graph showing detection data.

Part of the feature quantities will be described using example detection data of a pressure sensor 544 shown in FIG. 16. In the detection data of the pressure sensor 544, as shown in FIG. 16, time T1 is a filling start time, time T2 is a filling end time as well as a holding start time, time T3 is a holding end time as well as a cooling start time, and time T4 is a cooling end time as well as a die opening time. That is, the injection and filling step is from time T1 to time T2, the holding step is from time T2 to time T3, and the cooling step is from time T3 to time T4. In FIG. 16, a maximum holding pressure Pmax is a maximum pressure in the holding step, a holding area Sa is an integrated value of pressure in the holding step, and a cooling area Sb is an integrated value of pressure in the cooling step. The maximum holding pressure Pmax, the holding area Sa, and the cooling area Sb are part of the feature quantities.

Information indicating the control parameters are plural kinds of control parameters themselves used for controlling the molding machine 502, that is, a control parameter group [A] consisting of plural control parameters. The units of the respective control parameters may be adjusted so that the numbers of digits of the control parameters become equal to a preset, prescribed value. For example, the kinds of control parameters are an injection rate, a holding pressure, a holding time, a holding die temperature, a cooling time, a nozzle temperature, an injection pressure (nozzle pressure), etc.

Pieces of information indicating resin melting states are resin state discrimination parameters representing resin melting states. Values themselves of the resin state discrimination parameters do not have any meaning and the resin state discrimination parameters are indices to be used for grouping of resin melting states. The resin state discrimination parameters correspond to the respective feature quantities. That is, the number of resin state discrimination parameters is the same as that of the kinds of feature quantities. The plural kinds of resin state discrimination parameters are referred to as a resin state discrimination parameter group [P].

As shown in FIG. 15, the resin state discrimination parameter group [P] is represented by the feature quantity group [F] of detection data detected during molding and the control parameter group [A]. More specifically, the resin state discrimination parameter group [P] are defined as the feature quantity group [F] of detection data detected during molding divided by the control parameter group [A].

This relationship is represented by Equation (1), where the resin state discrimination parameter group [P] is a matrix consisting of resin state discrimination parameters P1 to Pm, the feature quantity group [F] is a vector consisting of feature quantities F1 to Fm, and the control parameter group [A] is a vector consisting of control parameters A(F1) to A(Fm).

[Formula 1]

$$[P] = [F]/[A] \quad (1)$$

where $$[P] = \begin{bmatrix} P1 \\ P2 \\ P3 \\ \vdots \\ Pm \end{bmatrix}, [F] = \begin{bmatrix} F1 \\ F2 \\ F3 \\ \vdots \\ Fm \end{bmatrix}, [A] = \begin{bmatrix} A(F1) \\ A(F2) \\ A(F3) \\ \vdots \\ A(Fm) \end{bmatrix}.$$

The control parameters A(F1) to A(Fm) are given by the following Equation (2). The control parameter A(Fj) is the product of plural control parameters Ak. One of two kinds described below is employed as the control parameter A(Fj).

[Formula 2]

$$A(Fj) = \Pi Ak \quad (2)$$

The control parameter A(Fj) of the first kind is the product of all of the control parameters Ak. For example, A(F1) and A(F2) are given by the following Equations (3) and (4), respectively:

[Formula 3]

$$A(F1) = A1 \times A2 \times A3 \times \ldots \times Am \quad (3)$$

[Formula 4]

$$A(F2) = A1 \times A2 \times A3 \times \ldots \times Am \quad (4)$$

The control parameter A(Fj) of the second kind is the product of part of the control parameters Ak. For example, A(F1) and A(F2) are given by the following Equations (5) and (6), respectively:

[Formula 5]

$$A(F1) = A3 \times A4 \times A9 \times \ldots \times Am-1 \quad (5)$$

[Formula 6]

$$A(F2) = A1 \times A2 \times A4 \times \ldots \times Am-2. \quad (6)$$

In the control parameter A(Fj) of the second kind, the part of the plural control parameters Ak consist of one or plural control parameters that are high in the degree of influence on the feature quantity Fj.

When values of the resin state discrimination parameters are obtained for each of a large number of sets of detection data, a resin melting state is classified as belonging to a certain group by performing a multivariate analysis using sets of values of the resin state discrimination parameters. That is, a multivariate analysis is performed that employs the plural resin state discrimination parameters as explanatory variables.

Figure 17:
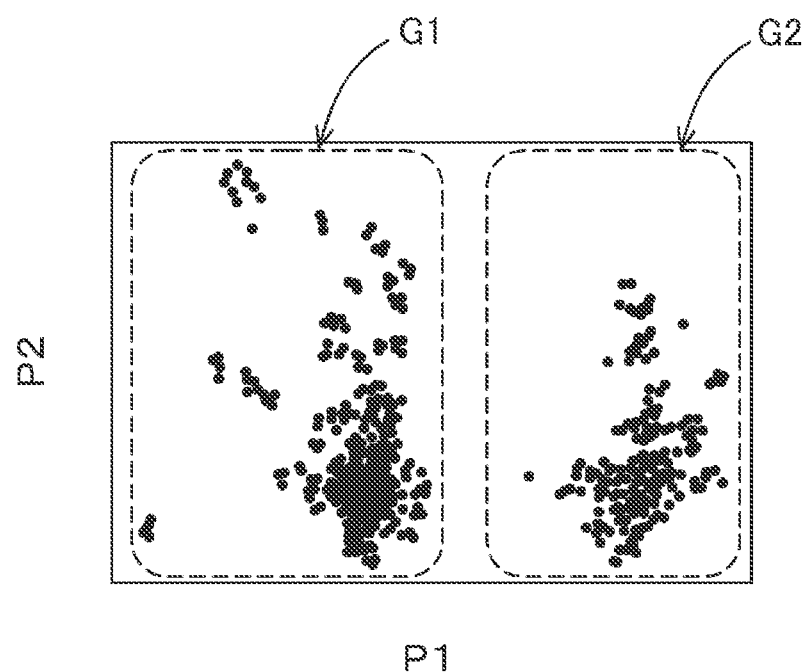
FIG. 17 is a diagram showing resin melting state groups.

To facilitate the description, assume a case there are two resin state discrimination parameters P1 and P2. In this case, as shown in FIG. 17, a two-dimensional coordinate system is obtained in which P1 and P2 are explanatory variables. Points representing sets of values of P1 and P2 are plotted for respective sets of detection data.

FIG. 17 shows a result of plotting of values of the two resin state discrimination parameters P1 and P2 obtained by using detection data and control parameter values acquired in a learning phase. It is seen that, for example, two resin melting state groups G1 and G2 are obtained. In this case, a resin melting state obtained by using newly acquired detection data and values of the control parameters is classified as belonging to one of the two groups G1 and G2.

In particular, it is preferable that a cluster analysis be performed as a multivariate analysis using the resin state discrimination parameters as explanatory parameters and resin melting state groups as object variables. In this case, a learned model can be generated by performing machine learning of a cluster analysis using a training data set including the explanatory parameters and the object variables. A resin melting state group can be determined using the generated learned model.

In the cluster analysis, the number of resin melting state groups is set in advance. That is, a learned model is generated so that resin melting states are classified into a preset number of groups. As described later, it is preferable that the number of groups be set at such a number that a mold product is given desired quality when the molding conditions are modified using sets of molding condition modification amounts that are set for respective resin melting state groups.

5. Configuration of Resin State Estimation Device 503

The configuration of the resin state estimation device 503 will be described with reference to FIG. 18. The resin state estimation device 503 is a device for acquiring a resin melting state group described above. For example, the resin state estimation device 503 is equipped with a computing device having a processor, a storage device, an interface, etc. and an input device and an output device that can be connected to the interface of the computing device. For example, the output device may include a display device. Alternatively, the computing device, the input device, and the output device may constitute a single unit with no interfaces provided between them. A physical server or a cloud server may be employed as part of the computing device and part of the storage device.

Figure 18:
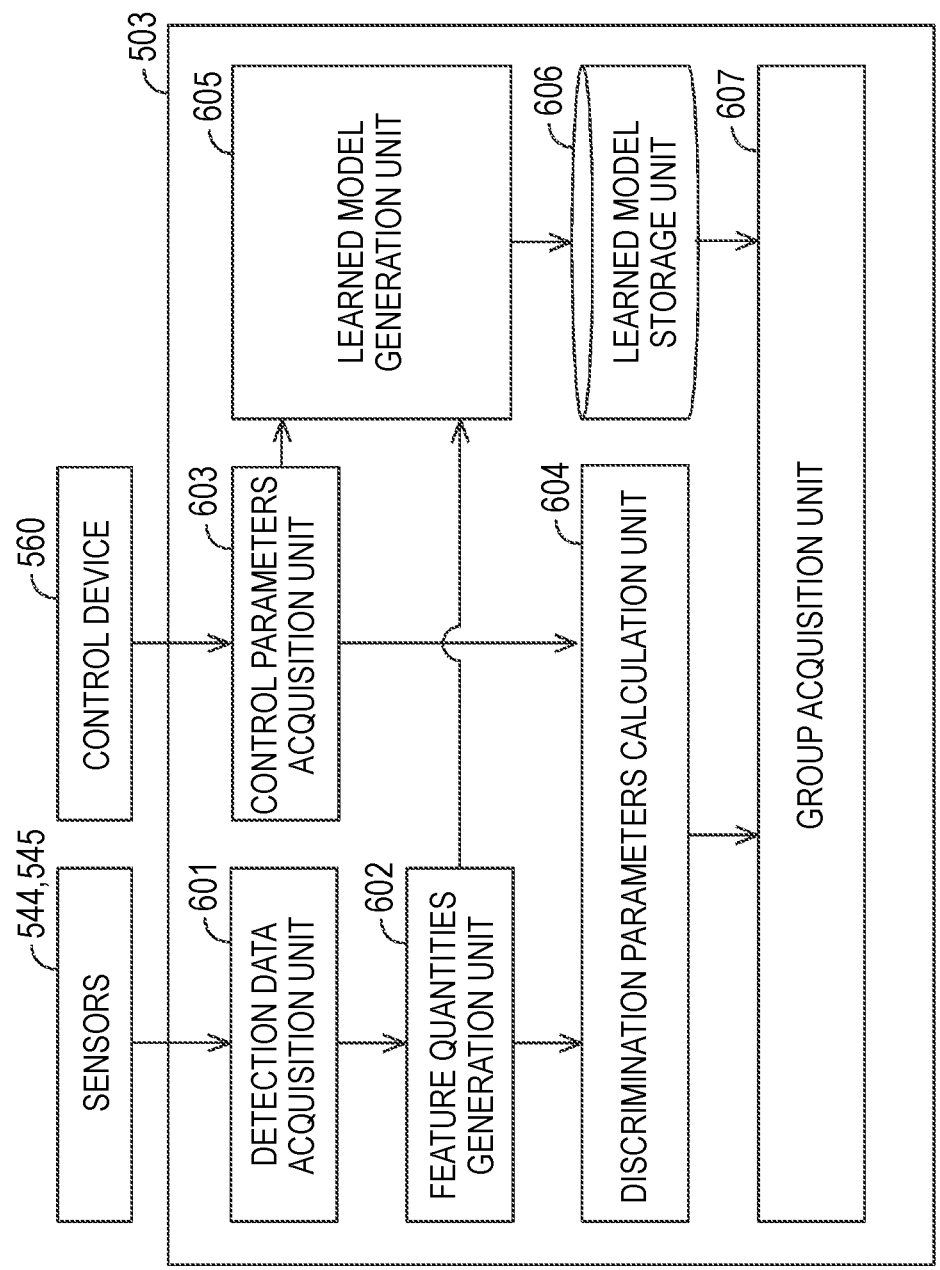
FIG. 18 is a block diagram showing the functional configuration of a resin state estimation device.

As shown in FIG. 18, the resin state estimation device 503 is equipped with a detection data acquisition unit 601, a feature quantities generation unit 602, a control parameters acquisition unit 603, a discrimination parameters calculation unit 604, a learned model generation unit 605, a learned model storage unit 606, and a group acquisition unit 607.

The detection data acquisition unit 601 acquires detection data that are detected by the sensors 544 and 545 attached to the molding machine 502. For example, detection data detected by a pressure sensor 544 are time-series data as shown in FIG. 16. Although not shown in any drawing, detection data detected by a temperature sensor 545 are also time-series data.

The feature quantities generation unit 602 generates a feature quantity group [F](see Equation (1)) consisting of plural kinds of feature quantities relating to the detection data on the basis of the detection data. That is, plural kinds of feature quantities are generated for each set of detection data. The feature quantities are statistical parameters (maximum value, minimum value, average, variance, maximum differentiation value, minimum differentiation value, integration value, etc.) of detection data of each sensor 544 or sensor 545 in the molding steps (injection and filling step, holding step, cooling step, etc.)

The control parameters acquisition unit 603 acquires values of the control parameter group [A] consisting of the plural kinds of control parameters to be used for control in the molding machine 502 (see Equation (1)). For example, the kinds of control parameters are an injection rate, a holding pressure, a holding time, a holding die temperature, a cooling time, a nozzle temperature, an injection pressure (nozzle pressure), etc.

The discrimination parameters calculation unit 604 calculates values of the resin state discrimination parameters P1 to Pm corresponding to the respective feature quantities on the basis of the values of the feature quantity group [F] and the values of the control parameter group [A]. The discrimination parameters calculation unit 604 calculates values of the resin state discrimination parameters P1 to Pm according to the above-mentioned Equations (1) and (2).

As indicated by the above-mentioned Equations (3) and (4), the discrimination parameters calculation unit 604 may calculate values of the resin state discrimination parameters Pj using the values of all the control parameters Ak (the product of all the control parameters Ak) in each of the values of the control parameters A(F1) to A(Fm).

Alternatively, as indicated by the above-mentioned Equations (5) and (6), the discrimination parameters calculation unit 604 may calculate a value of the resin state discrimination parameter Pj corresponding to the feature quantity Fj using the values of the feature quantity Fj and one or more control parameters Ak that are high in the degree of influence on the feature quantity Fj (the product of part of the control parameters Ak) in each of the values of the control parameters A(F1) to A(Fm).

For example, one or more control parameters Ak that are high in the degree of influence on the feature quantity Fj may be extracted by machine learning using the subject feature quantity Fj and the control parameter group [A]. For example, a prescribed number of control parameters Ak can be extracted starting from one that is highest in the degree of influence using degree-of-influence coefficients obtained by machine learning. Examples of the degree-of-influence coefficients are lasso coefficients obtained by lasso regression and ridge coefficients obtained by ridge regression.

The learned model generation unit 605 generates a learned model of machine learning in a learning phase. Where by definition resin melting states are classified into plural groups G1, G2, . . . , the learned model generation unit 605 employs a cluster analysis (multivariate analysis) in which the resin state discrimination parameters P1 to Pm are explanatory variables and the resin melting state groups G1, G2, . . . are object variables.

The learned model generation unit 605 generates a learned model by performing cluster analysis machine learning using training data sets including the above explanatory variables and object variables. The generated learned model is stored in the learned model storage unit 606. That is, the learned model outputs a group when receiving values of the resin state discrimination parameters.

The group acquisition unit 607 acquires resin a melting state group G1, G2, . . . on the basis of values of the resin state discrimination parameters P1 to Pm. In this example, the group acquisition unit 607 uses the learned model that has been generated using the cluster analysis (multivariate analysis) in which the resin state discrimination parameters P1 to Pm are explanatory variables. That is, the group acquisition unit 607 acquires a resin melting state group G1, G2, . . . as an output of the learned model when receiving values of the resin state discrimination parameters P1 to Pm in a machine learning application phase (inference phase).

As described above, the resin state estimation device 503 determines a group of a melting state of resin in the cavity C2 during molding of a target mold product using detection data obtained during the molding of the target mold product and values of the control parameters used for the molding of the target mold product.

6. Advantageous Effects of Resin State Estimation Device 503

As described above, detection data that are detected by the sensors 544 and 545 attached to the molding machine 502 are considered to be influenced by values of the control parameters of the molding machine 502 and a melting state of resin in the cavity C2. In other words, the resin melting state is defined so as to be represented by the feature quantity group [F] generated from detection data and the control parameter group [A].

Based on this definition, the discrimination parameters calculation unit 604 calculates values of the resin state discrimination parameters P1 to Pm corresponding to values of the feature quantities F1 to Fm and indicating a resin melting state on the basis of values of the feature quantity group [F] of detection data and values of the control parameter group [A]. That is, the values of the resin state discrimination parameters P1 to Pm are generated in the same number as the number of kinds of the feature quantities F1 to Fm.

Where by definition resin melting states are classified into plural groups G1, G2, . . . , the group acquisition unit 607 acquires resin melting state groups G1, G2, by performing a multivariate analysis in which the resin state discrimination parameters P1 to Pm are explanatory variables, on the basis of sets of values of the resin state discrimination parameters P1 to Pm. Although it is not necessary to define the resin melting state groups G1, G2, . . . clearly, classification may be made using the degree of flowability as one factor.

That is, the resin state estimation device 503 can classify a mold product concerned as belonging to one of the groups G1, G2, . . . of melting states of resin in the cavity C2 (e.g., the degree of resin flowability is one factor of the classification) by performing computation using detection data and control parameter values. Since melting states of resin in the cavity C2 can be grouped in the above-described manner, modification amounts of the molding conditions can be determined so as to be suitable for a group G1, G2, . . . .

7. Second Example Molding Machine System 501B

Figure 19:
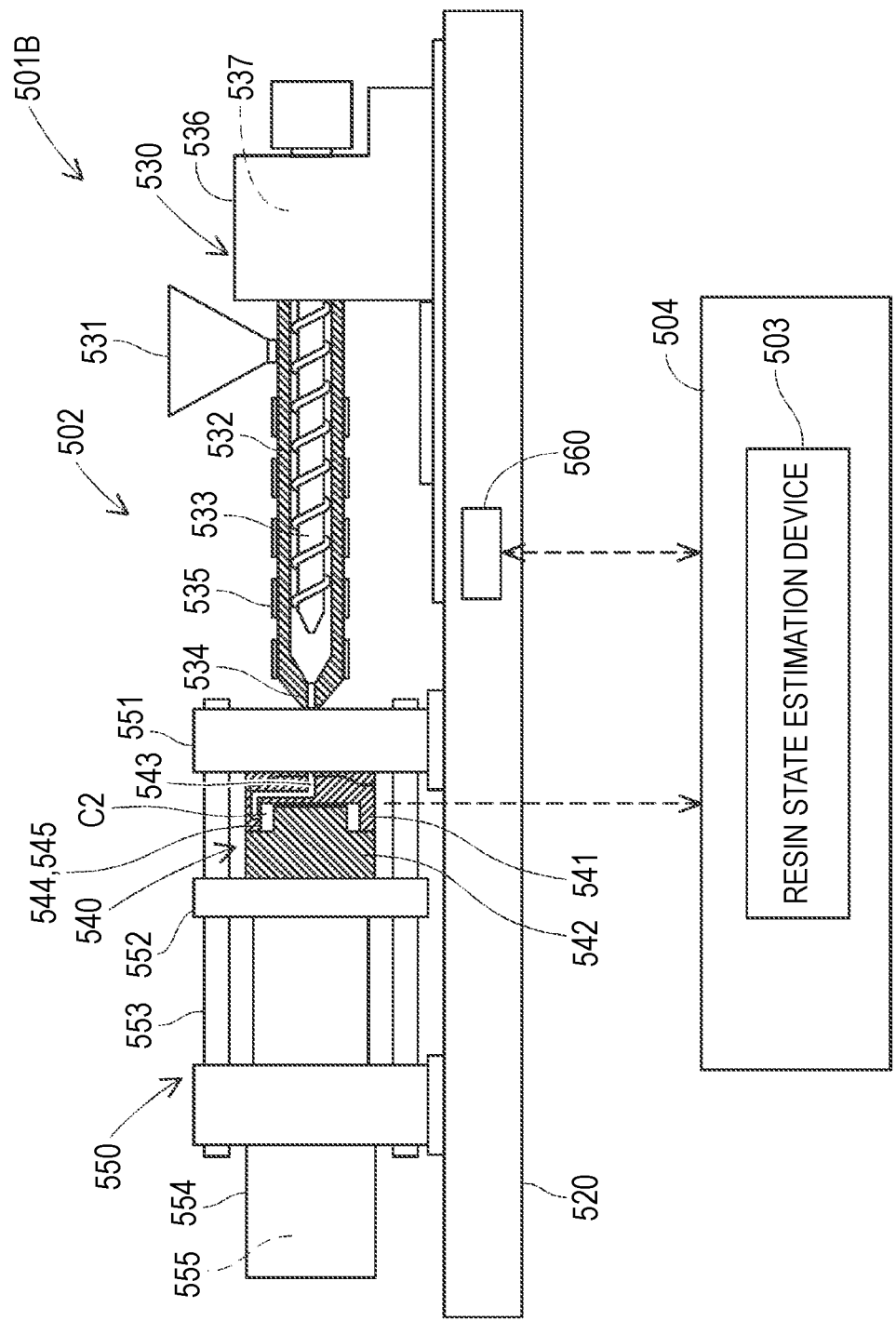
FIG. 19 is a diagram showing an overall configuration of a second example molding machine system according to the second embodiment.

A second example molding machine system 501B including a molding conditions determination assist device 504 will be described with reference to FIG. 19. As shown in FIG. 19, the molding machine system 501B is equipped with a molding machine 502 and the molding conditions determination assist device 504.

The molding conditions determination assist device 504 is a device for determining molding conditions of the molding machine 502. In particular, in this example, the molding conditions determination assist device 504 determines modification amounts of the molding conditions to improve the quality of a mold product when a mold product has already been produced under certain molding conditions. Furthermore, including the above-described resin state estimation device 503, the molding conditions determination assist device 504 performs processing utilizing a resin melting state group obtained by the resin state estimation device 503.

8. Configuration of Molding Conditions Determination Assist Device 504

The configuration of the molding conditions determination assist device 504 will be described with reference to FIGS. 20-24. For example, the molding conditions determination assist device 504 is equipped with a computing device having a processor, a storage device, an interface, etc. and an input device and an output device that can be connected to the interface of the computing device. For example, the output device may be configured so as to include a display device. Alternatively, the computing device, the input device, and the output device may constitute a single unit without intervention of an interface. A physical server or a cloud server may be employed as part of the computing device and part of the storage device.

Figure 20:
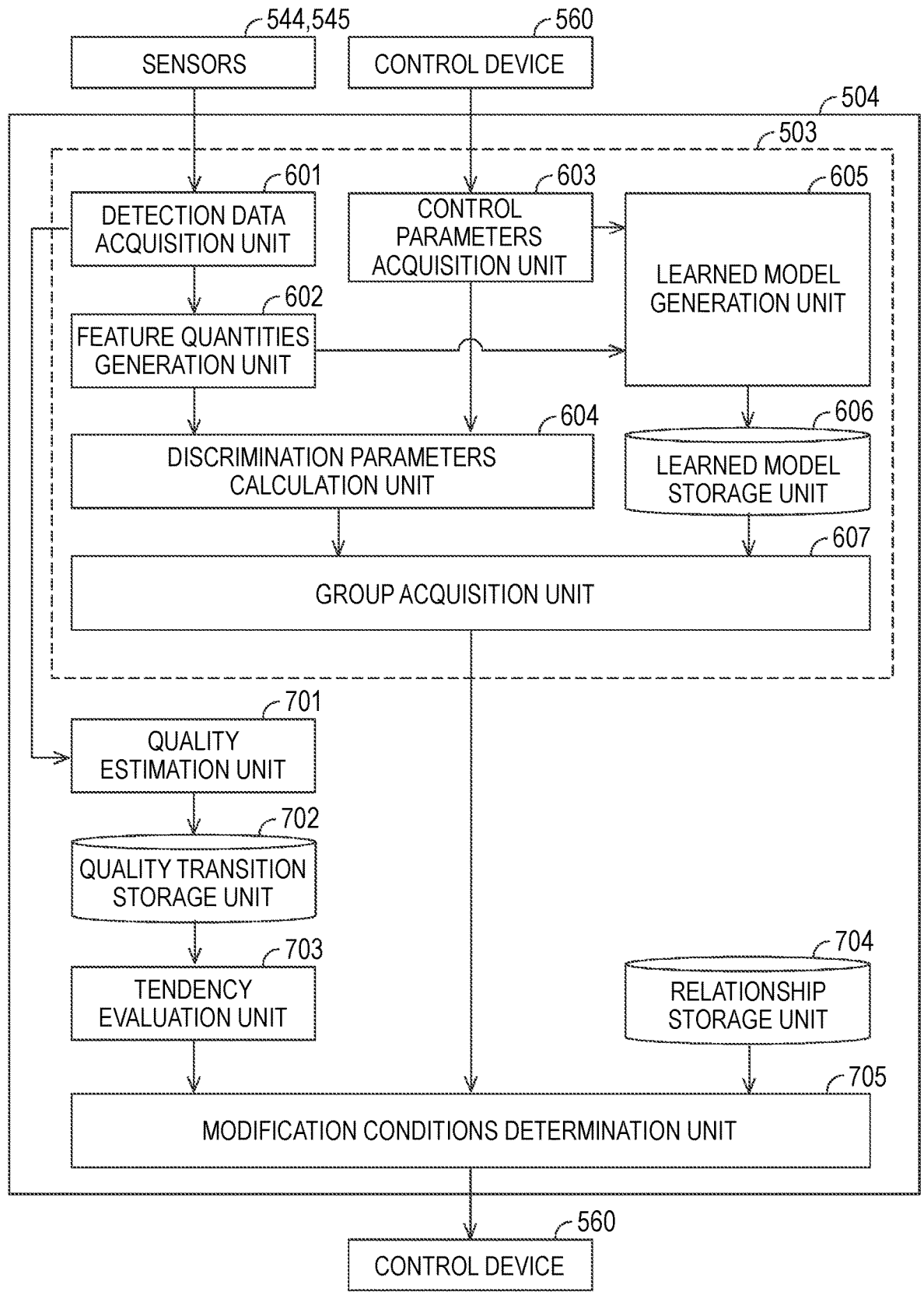
FIG. 20 is a block diagram showing the functional configuration of a molding conditions determination assist device.

As shown in FIG. 20, the molding conditions determination assist device 504 is equipped with the resin state estimation device 503, a quality estimation unit 701, a quality transition storage unit 702, a tendency evaluation unit 703, a relationship storage unit 704, and a modification conditions determination unit 705. The resin state estimation device 503 has the same configuration as the resin state estimation device 503 described above in describing the first example molding machine system 501A.

The quality estimation unit 701 estimates quality of a mold product by machine learning on the basis of detection data acquired by the detection data acquisition unit 601. For example, the quality estimation unit 701 estimates a numerical value of one or plural quality items of a mold product. The quality items of a mold product are at least one of the mass, dimension, and void volume of the mold product.

The quality estimation unit 701 generates, in advance, learned models by learning relationships between the detection data and the quality of a mold product by machine learning. The learned models are generated for respective quality items. The quality estimation unit 701 is stored with the learned models and estimates quality of a mold product using newly acquired detection data and the learned models.

The quality transition storage unit 702 accumulates pieces of quality information of mold products estimated by the quality estimation unit 701 and stores quality transitions of those plural mold products. The quality transition is information that pieces of quality information of plural mold products are arranged in order of molding, such as data (mass data) shown in FIG. 21. In FIG. 21, symbol "Std" represents prescribed standard quality and symbols "Thmax and Thmin" represent an upper limit value and a lower limit value of an allowable quality range, respectively. That is, a mold product whose quality is between the upper limit value Thmax and the lower limit value Thmin is a good product and a mold product whose quality is out of this range is a defective product. Ideally, even good products should have the prescribed standard quality Std.

In FIG. 21, in an initial stage of molding most of mold products show quality values that are close to the standard quality Std excluding a mold product whose quality value is larger than the upper limit value Thmax (a sudden abnormality indicated by symbol "D2"). That is, the mold products produced in the initial stage of molding show values around the standard quality Std (indicated by symbol "D1" in FIG. 21) excluding the mold product of the sudden abnormality. As the molding is continued thereafter, the quality of a mold product departs from the standard quality Std gradually and comes to show values that are larger than the standard quality Std by +N % (indicated by symbol "D3" in FIG. 21).

The tendency evaluation unit 703 evaluates quality change tendencies with respect to the standard quality Std on the basis of the quality transitions stored in the quality transition storage unit 702. As shown in FIG. 22, the tendency evaluation unit 703 evaluates, as quality change tendencies, quality deviations from the standard quality Std and degrees of quality variation of plural mold products for plural respective quality items.

The number of quality transition mold products used for evaluation of quality change tendencies by the tendency evaluation unit 703 is set in advance. That is, the tendency evaluation unit 703 calculates quality deviations of mold products of the preset number. For example, the tendency evaluation unit 703 calculates, as quality deviations, deviations (absolute values or relative values) of quality average values of those mold products from the standard quality Std. The term "degrees of variation" means to what extents the quality items of mold products of the preset number vary (or the quality items of mold products of the preset number are stable). For example, the degrees of variation may be standard deviations, variances, or the like.

For example, as shown in FIG. 22, the tendency evaluation unit 703 evaluates that the mass has a deviation "+2.2%" and a degree of variation "stable," the dimension has a deviation "+0.3%" and a degree of variation "stable," and the void volume has a deviation "−0.5%" and a degree of variation "stable."

Furthermore, the tendency evaluation unit 703 produces an evaluation result that the quality transition D1 shown in FIG. 21 has a quality change tendency that the quality is around the standard quality Std stably. In evaluating the quality transition D1 shown in FIG. 21, the tendency evaluation unit 703 excludes the mold product that showed a quality change of a sudden abnormality (indicated by symbol "D2"). In this case, the tendency evaluation unit 703 produces an evaluation result that the deviation of the quality item concerned from the standard quality Std is equal to "0.1%" and the degree of variation is "stable." The sudden abnormality is judged irrelevant to the molding conditions because the quality of mold products returned to normal values after the sudden abnormality. Thus, evaluation is made excluding the sudden abnormality.

The tendency evaluation unit 104 produces evaluation result that the quality transition D3 shown in FIG. 21 has a quality change tendency that the quality item concerned is deviated from the standard quality Std by +N % stably. In this case, the tendency evaluation unit 703 produces an evaluation result that the deviation of the quality item concerned from the standard quality Std is equal to "+N %" and the degree of variation is "stable."

As described above, the group acquisition unit 607 of the resin state estimation device 503 acquires a group of a melting state of resin in the cavity C2. It is assumed here that, for example, the group acquisition unit 607 classifies a resin melting state as belonging to one of four groups, that is, type-A, type-B, type-C, and type-D as shown in FIG. 23.

Figure 24:
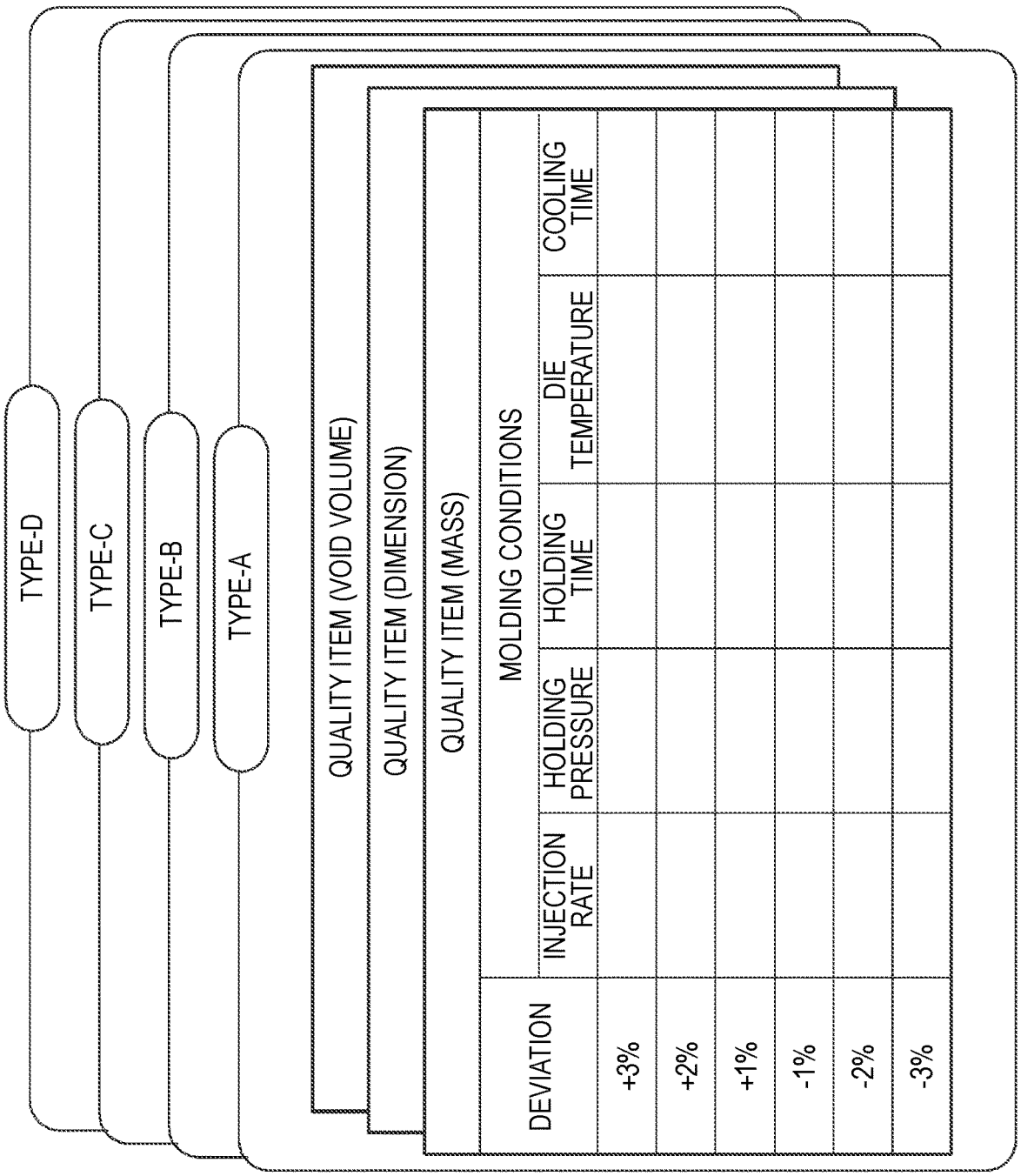
FIG. 24 is a diagram showing sets of relationships between quality deviations and modification amounts.

The relationship storage unit 704 is stored with sets of relationships between the quality change tendencies and the modification amounts of molding conditions for returning the quality to the standard quality in such a manner that the sets of relationships are correlated with the respective melting state groups of resin in the cavity C2. For example, as shown in FIG. 24, the relationship storage unit 704 is stored with, for each resin melting state group, relationships between the quality change tendency and the modification amounts of the molding conditions. More specifically, the relationship storage unit 704 is stored with, for each resin melting state group and for each quality item, a matrix showing a relationship between the deviation level and the modification amount of each molding condition. For example, six deviation levels are set for each of the mass, dimension, and void volume. Modification target molding conditions are at least one of an injection rate, a holding pressure, a holding time, a holding die temperature, a cooling time, etc.

To what extent each quality item is related to the molding conditions and a relationship between the deviation of each quality item and the modification amounts of the molding conditions can be derived using machine learning. That is, relationships to be stored in the relationship storage unit 704 can be generated by machine learning. Naturally, such relationships may be set on the basis of experiments, past experiences, etc. rather than by machine learning.

The modification conditions determination unit 705 determines modification amounts of the molding conditions on the basis of quality change tendencies obtained by the tendency evaluation unit 703, a resin melting state group acquired by the group acquisition unit 607, and the relationships stored in the relationship storage unit 704.

First, the modification conditions determination unit 705 selects, from the sets of relationships shown in FIG. 24, relationships corresponding to the resin melting state group acquired by the group acquisition unit 607. Then, for example, the modification conditions determination unit 705 determines levels that are closest to deviations obtained by the tendency evaluation unit 703 in the matrix relationships shown in FIG. 24 and employs modification amounts of the molding conditions corresponding to each determined level. For example, as shown in FIG. 22, when the mass deviation is "+2.2%," a mass deviation level "+2%" in the matrix shown in FIG. 24 is selected.

The modification conditions determination unit 705 determines modification amounts of the molding conditions for each of the plural quality items. The modification conditions determination unit 705 determines a final modification amount of each molding condition on the basis of plural modification amounts of the molding condition. In this case, for example, the modification conditions determination unit 705 may employ, as a final modification amount, the sum of the plural modification amounts or the sum of the plural modification amounts multiplied by weights for the respective quality items.

Furthermore, the modification conditions determination unit 705 outputs the final correction amounts to the control device 560 of the molding machine 502 and thereby causes the molding conditions for the next mold product to be modified by the modification amounts. The control device 560 performs molding for the next mold product under the modified molding conditions. As a result, the quality of the mold product produced under the modified molding conditions can be made closer to the standard quality Std.

9. Advantageous Effects of Molding Conditions Determination Assist Device 504

Advantageous effects of the above-described molding conditions determination assist device 504 will be described below. The quality transition storage unit 702 accumulates pieces of quality information of mold products estimated by machine learning, and stores quality transitions of those plural mold products. Each quality transition is pieces of information that pieces of quality information of plural mold products are arranged in order of molding. Thus, the tendency evaluation unit 703 can evaluate a quality change tendency on the basis of a quality transition of plural consecutive mold products.

In particular, the tendency evaluation unit 703 evaluates quality change tendencies with respect to the prescribed standard quality Std. For example, the tendency evaluation unit 703 can generate a quality change tendency that a state that a quality item is deviated from the standard quality Std is continuing, a quality change tendency that a quality item is varying in a quality allowable range including a prescribed standard quality Std, or the like.

The relationships between the quality change tendencies and the modification amounts of the molding conditions are stored in the relationship storage unit 704 in advance so as to be correlated with each of the groups of melting states of resin in the cavity C2. That is, the relationships between the quality change tendencies and the modification amounts of the molding conditions are stored in the relationship storage unit 704 for each of the groups of resin melting states. These relationships have been set using know-how of skilled workers, output results of machine learning, experimental results, etc.

The modification conditions determination unit 705 determines modification amounts of the molding conditions on the basis of newly evaluated quality change tendencies, a newly acquired group of melting states of resin in the cavity C2, and the relationships stored in the relationship storage unit 704. The relationships stored in the relationship storage unit 704 relate to the modification amounts of the molding conditions to be used for returning the quality to the prescribed standard quality Std. In particular, the modification amounts of the molding conditions stored in the relationship storage unit 704 are ones determined according to each group of resin melting states in the cavity C2. Thus, the quality of a mold product to be produced next can be made closer to the standard quality Std if the molding conditions of the molding machine 502 are modified according to modification amounts of the molding conditions determined by the modification conditions determination unit 705.

That is, even in a case that the quality of a mold product is varied by an external factor such as an ambient temperature or slight differences in the components of the molding material (base material), the molding conditions can be modified so that the quality of a mold product becomes the prescribed standard quality Std by recognizing quality change tendencies and, furthermore, classifying resin melting states in the cavity C2 into groups. Thus, not only a skilled worker but also an unskilled worker can modify the molding conditions so as to improve the quality of mold products.

10. Method for Setting the Number of Groups

The learned model generation unit 605 performs processing of setting the number of groups of resin melting states by cooperating with other units in addition to generating a learned model (described above). Whereas a worker can set the number of groups to a desired number, the number of groups can be set at a proper number by utilizing the above-described molding conditions determination assist device 504.

The learned model generation unit 605 acquires a resin melting state group (G1 or G2) of acquired detection data in a state that the number of groups of resin melting states is set at an initial setting number (e.g., 2) (group acquiring step).

Then the learned model generation unit 605 sets relationships between the quality change tendencies and the modification amounts of the molding conditions so as to be correlated with each of the resin melting state groups in the case that the number of groups is set at the initial setting number (relationships setting step). The learned model generation unit 605 stores these relationships in the relationship storage unit 704. Then the learned model generation unit 605 determines modification amounts of the molding conditions (modification amounts of control parameters) on the basis of the acquired group (G1 or G2) and the relationships stored in the relationship storage unit 704 (modification amounts determining step).

Subsequently, when the control parameters have been modified on the basis of the modification amounts of the control parameters corresponding to the acquired resin melting state group G1 or G2, the learned model generation unit 605 judges whether the quality of a mold product is within a prescribed range (judging step).

If the quality of the mold product is not within a prescribed range, the learned model generation unit 605 increases the number of groups and executes the group acquiring step, the relationships setting step, the modification amounts determining step, and the judging step again. That is, if the quality of the mold product is not within the prescribed range, the learned model generation unit 605 repeatedly executes a process of increasing the number of groups, acquires a resin melting state group, and judges whether quality of a mold product is within the prescribed range. The learned model generation unit 605 sets, as the number of groups in the learned model, the number of groups with which the quality of a mold product has fallen within the prescribed range.

When the number of groups has been set in the above manner, modification amounts of the molding conditions can be determined according to the resin melting state group. That is, proper modification amounts of the molding conditions can be determined.

11. Example Configurations of Molding Machine System 501B

11-1. First Example

Figure 25:
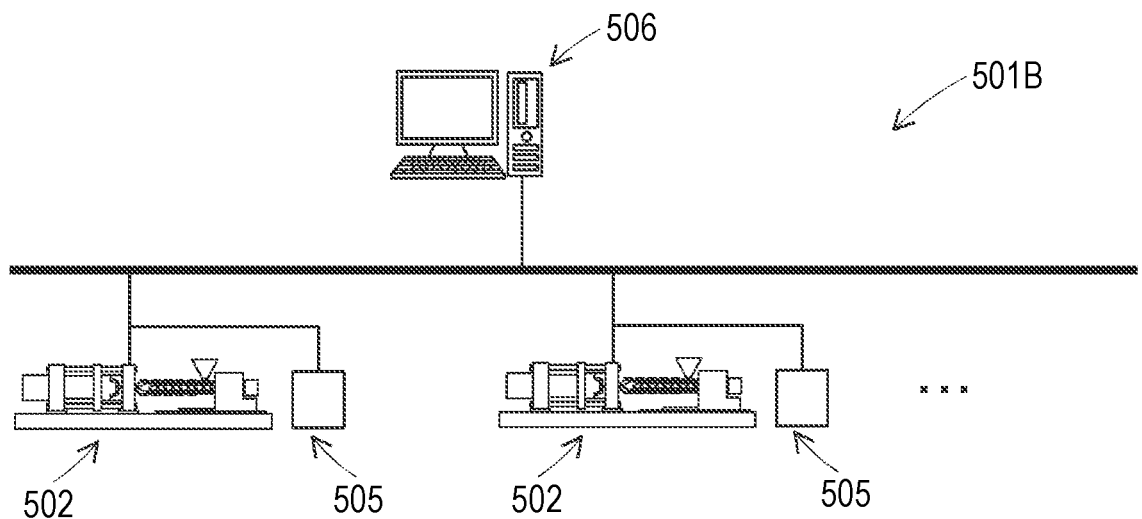
FIG. 25 is a diagram showing an example configuration of a molding machine system.

The configuration of a first example molding machine system 501B will be described with reference to FIG. 25. As shown in FIG. 25, the molding machine system 501B is equipped with plural molding machines 502, edge computers 505 which are integrated with the respective molding machines 502, and a server 506 which constitutes the same network with the plural molding machines 502. Each edge computer 505 may either be part of or be separate from the associated molding machine 502.

The edge computers 505 and the server 506 constitute the molding conditions determination assist device 504. Each edge computer 505 is equipped with the detection data acquisition unit 601. The server 506 is equipped with the units, other than the detection data acquisition unit 601, of the resin state estimation device 503, the quality estimation unit 701, the quality transition storage unit 702, the tendency evaluation unit 703, the relationship storage unit 704, and the modification conditions determination unit 705.

That is, the server 506 receives detection data acquired by the detection data acquisition unit 601 from each edge computer 505 that is separate from or is incorporated in the associated molding machine 502. The server 506 determines modification amounts of the molding conditions on the basis of the received information and transmits the determined modification amounts of the molding conditions to the molding machine 502.

In this case, the server 506 can accumulate information relating to the plural molding machines 502. Furthermore, the feature quantities generation unit 602, recognition parameters calculation unit 604, the group acquisition unit 607, the quality estimation unit 701, the tendency evaluation unit 703, and the modification conditions determination unit 705 can perform processing at high speed by having the server 506 equipped with a processor capable of high-speed processing. On the other hand, the cost of each edge computer 505 can be made low because it need not be of a high-level specification.

11-2. Second Example

As in the first example, a second example molding machine system 501B is equipped with plural molding machines 502, edge computers 505 which are connected to the respective molding machines 502, and a server 506 which constitutes the same network with the plural molding machines 502.

Each edge computer 505 is equipped with all the units of the resin state estimation device 503 and the quality estimation unit 701. The server 506 is equipped with the quality transition storage unit 702, the tendency evaluation unit 703, the relationship storage unit 704, and the modification conditions determination unit 705. That is, the server 506 receives a resin melting state group acquired by the group acquisition unit 607 of the resin state estimation device 503 and quality of a mold product estimated by the quality estimation unit 701 from each edge computer 505 that is separate from or is incorporated in the associated molding machine 502. The server 506 determines modification amounts of the molding conditions on the basis of the received information and transmits the determined modification amounts of the molding conditions to the molding machine 502.

11-3. Third Example

In a third example molding machine system 501B, a server 506 has all the functions. In this case, no edge computers 505 are necessary. The detection data acquisition unit 601 of the server 506 receives detection data detected by the sensors 544 and 545 from each molding machine 502. The modification conditions determination unit 705 of the server 506 transmits modification amounts of the molding conditions to the molding machine 502.

A molding conditions determination assist device according to a third embodiment will be described below. However, the concept of the present disclosure is not limited to the third embodiment and various design changes can be made without departing from the spirit and scope of the disclosure.

1. Application Targets

The molding conditions determination assist device is applied to a molding method for producing a mold product by supplying molten material obtained by melting molding material into the cavity of a die of an injection molding machine. An example target molding machine is an injection molding machine that performs injection molding on a molding material such as resin or rubber. Other example target molding machines are a blow molding machine and a compression molding machine. Example resins as molding materials are a thermoplastic resin such as polyamide itself and a reinforced resin obtained by adding a bulking agent to a thermoplastic resin base material. An example bulking agent is a micrometer-size filler or a nanometer-size filler Example fillers are glass fiber and carbon fiber.

2. Molding Machine System 1001

Figure 26:
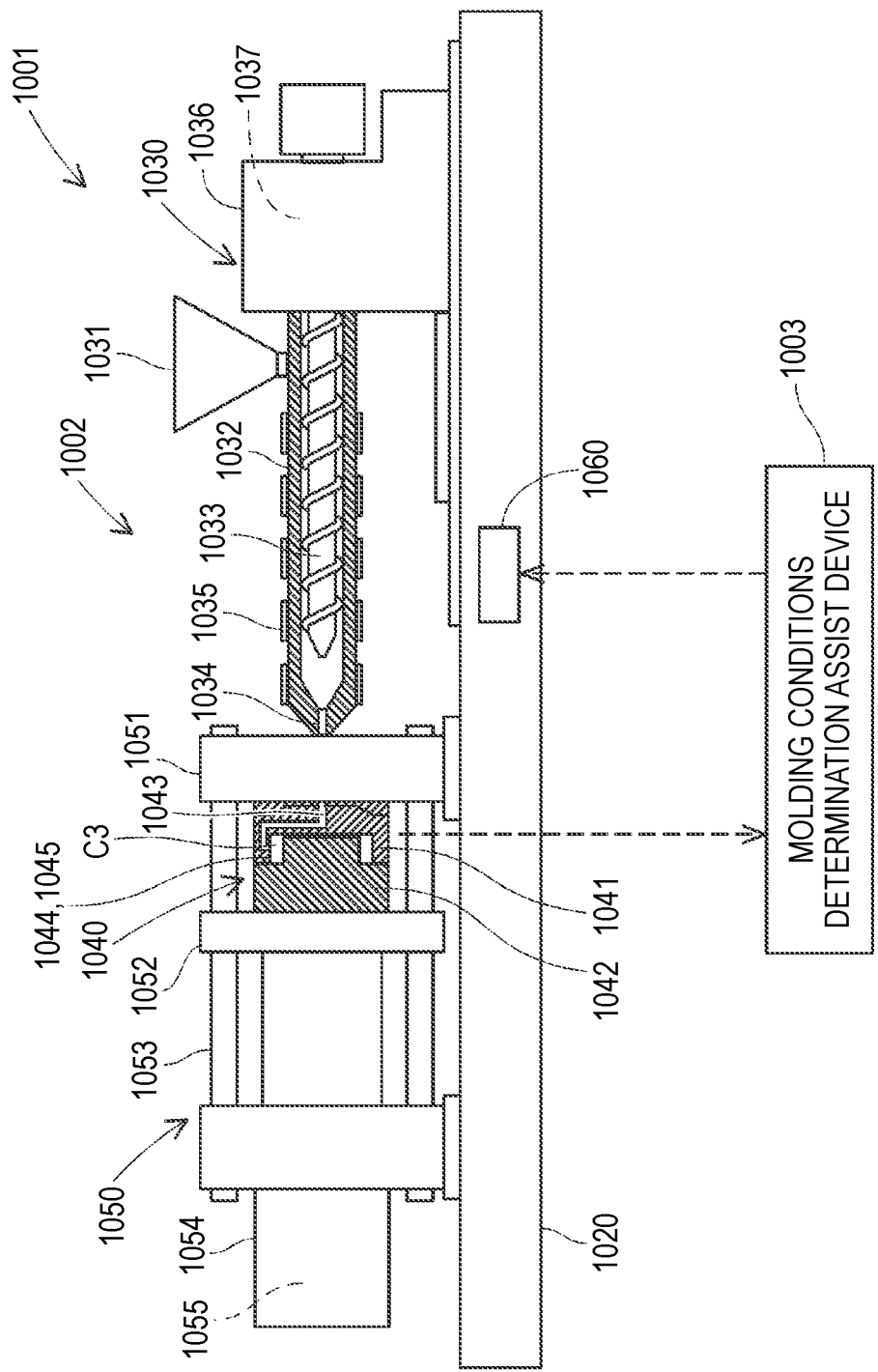
FIG. 26 is a diagram showing an overall configuration of a molding machine system according to a third embodiment.

A molding machine system 1001 including a molding conditions determination assist device will be described with reference to FIG. 26. As shown in FIG. 26, the molding machine system 1001 is equipped with a molding machine 1002 and a molding conditions determination assist device 1003.

The molding machine 1002 is an injection molding machine, a blow molding machine, a compression molding machine, or the like. In this example, the molding machine 1002 is an injection molding machine. For example, the molding machine 1002 produces a resin mold product by molding. The molding conditions determination assist device 1003 is a device for determining molding conditions of the molding machine 1002. In particular, in this example, the molding conditions determination assist device 1003 determines modification amounts of molding conditions for increasing the quality of a mold product from the quality of one that has been produced under certain molding conditions.

The molding conditions determination assist device 1003 may be either a device that is separate from the molding machine 1002 or a built-in device of the molding machine 1002. Alternatively, the molding conditions determination assist device 1003 may be such that part of it is incorporated in the molding machine 1002 and the remaining part is implemented as a separate device. Where all or part of the molding conditions determination assist device 1003 is separate from the molding machine(s) 1002, the separate part maybe connected to either only a single molding machine 1002 or plural molding machines 1002. In the latter case, the separate part of the molding conditions determination assist device 1003 and the plural molding machines 1002 constitute the same network and can communicate with each other.

3. Molding Machine 1002

3-1. Configuration of Molding Machine 1002

The configuration of an injection molding machine as an example of the molding machine 1002 will be described with reference to FIG. 26. The molding machine 1002 is mainly equipped with a bed 1020, an injection machine 1030, a die 1040, a clamping device 1050, and a control device 1060.

The injection machine 1030 is mounted on the bed 1020. The injection machine 1030 is a machine for melting molding material and supplying resulting molten material to the cavity C3 of the die 1040 by applying pressure to the molten material. The injection machine 1030 is mainly equipped with a hopper 1031, a heating cylinder 1032, a screw 1033, a nozzle 1034, a heater 1035, a drive device 1036, and an injection machine sensor 1037.

The hopper 1031 is an inlet of pellets (grainy molding material) that are molding material (base material). The heating cylinder 1032 applies pressure to molten material obtained by melting, by heating, the pellets that are input to the hopper 1031. The heating cylinder 1032 is disposed so as to be movable with respect to the bed 1020 in the axial direction of the heating cylinder 1032. The screw 1033 is disposed inside the heating cylinder 1032 so as to be rotatable and movable in the axial direction. The nozzle 1034, which is an injection outlet provided at the tip of the heating cylinder 1032, supplies molten material into the die 1040 from inside the heating cylinder 1032 when the screw 1033 is moved in the axial direction.

Disposed, for example, outside the heating cylinder 1032, the heater 1035 heats pellets existing inside the heating cylinder 1032. For example, the drive device 1036 moves the heating cylinder 1032 in the axial direction and rotates the screw 1033 and moves it in the axial direction. The injection machine sensor 1037 is a generic term of sensors for acquiring a molten material storage amount, a holding pressure, a holding time, an injection rate, a state of the drive device 1036, and other parameters. The injection machine sensor 1037 may acquire not only the above kinds of information but also various other kinds of information.

The die 1040 is equipped with a fixed-side first die 1041 and a movable-side second die 1042. In the die 1040, a cavity C3 is formed between the first die 1041 and the second die 1042 by clamping the first die 1041 and the second die 1042 together. The first die 1041 has a supply passage 1043 (sprue, runner, and gate) for guiding, to the cavity C3, molten material supplied from the nozzle 1034. The die 1040 is further equipped with pressure sensors 1044 and temperature sensors 1045. The pressure sensors 1044 detect pressures received from the molten material existing in the supply passage 1043. The temperature sensors 1045 detect, directly, temperatures of the molten material existing in the supply passage 1043.

The clamping device 1050 is mounted on the bed 1020 so as to be opposed to the injection machine 1030. The clamping device 1050 performs an operation of opening/closing the die 1040 and prevents the die 1040 from being opened by pressure of molten material injected into the cavity C3 in a state that the die 1040 is clamped.

The clamping device 1050 is equipped with a fixed plate 1051, a movable plate 1052, die bars 1053, a drive device 1054, and a clamping device sensor 1055. The first die 1041 is fixed to the fixed plate 1051. Capable of coming into contact with the nozzle 1034 of the injection machine 1030, the fixed plate 1051 guides molten material ejected from the nozzle 1034 to the die 1040. The second die 1042 is fixed to the movable plate 1052. The movable plate 1052 can come closer to and go away from the fixed plate 1051. The die bars 1053 support the movable plate 1052 being moved. Being, for example, a cylinder device, the drive device 1054 moves the movable plate 1052. The clamping device sensor 1055 is a generic term of sensors for acquiring a clamping force, a die temperature, a state of the drive device 1054, and other parameters.

The control device 1060 controls the drive device 1036 of the injection machine 1030 and the drive device 1054 of the clamping device 1050. For example, the control device 1060 acquires various kinds of information from the injection machine sensor 1037 and the clamping device sensor 1055 and controls the drive device 1036 of the injection machine 1030 and the drive device 1054 of the clamping device 1050 so that they operate according to operation command data.

3-2. Molding Method

A molding method for forming a mold product by the molding machine 1002 will be described below. In the molding method of the molding machine 1002, an amount measuring step, a clamping step, an injection and filling step, a holding step, a cooling step, and a release and ejection step are executed sequentially in one cycle. These steps are executed sequentially again in producing the next mold product. The amount measuring step and the clamping step constitute a start/preparation step, the injection and filling step, the holding step, and the cooling step make up a molding step, and the release and ejection step is an ending step. Alternatively, an initial part (to immediately after die opening) of the release and ejection step may be included in the molding step, in which case the ending step includes only the latter part of the release and ejection step.

In the amount measuring step, molten material is stored between the tip of the screw 1033 and the nozzle 1034 inside the heating cylinder 1032 while pellets are melted by heating by the heater 1035 and shearing friction heat generated by rotation of the screw 1033. Since the screw 1033 retreats as the storage amount of molten material increases, a storage amount of molten material is measured on the basis of a retreat position of the screw 1033.

In the clamping step which follows the amount measuring step, clamping is performed in which the first die 1041 and the second die 1042 are combined together by moving the movable plate 1052. Furthermore, the heating cylinder 1032 is moved in the axial direction so that it comes closer to the clamping device 1050 and the nozzle 1034 is connected to the fixing plate 1051 of the clamping device 1050. Subsequently, in the injection and filling step, the screw 1033 is moved toward the nozzle 1034 by a prescribed pushing force in a state that the rotation of the screw 1033 is stopped, whereby molten material is injected into the die 1040 at a high pressure and fills up the die 1040. The process moves to the holding step as soon as the cavity C3 is filled with molten material.

In the holding step, holding processing is performed in which a prescribed pressure (holding pressure) is applied to the molten material in the cavity C3 for a prescribed time by pressing molten material further into the cavity C3 that is already filled with molten material. More specifically, the prescribed holding pressure is applied to the molten material by applying a prescribed pushing force to the screw 1033.

After the holding processing has been performed at the prescribed holding pressure for the prescribed time, the process moves to the cooling step. In the cooling step, processing of decreasing the holding pressure by stopping the pushing-in of molten material is performed and the die 1040 is cooled, whereby the molten material that has been supplied to the die 1040 solidifies. Finally, in the release and ejection step, the second die 1042 is separated from the first die 1041 and a mold product is taken out.

3-3. Die 1040

Figure 27:
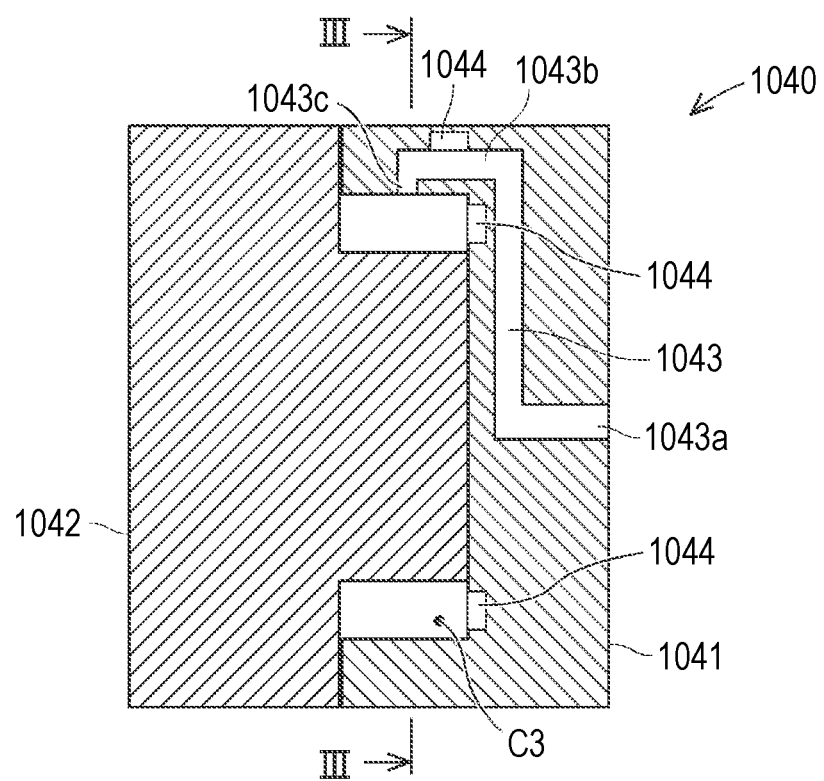
FIG. 27 is an enlarged view of a die of a molding machine shown in FIG. 26.
Figure 28:
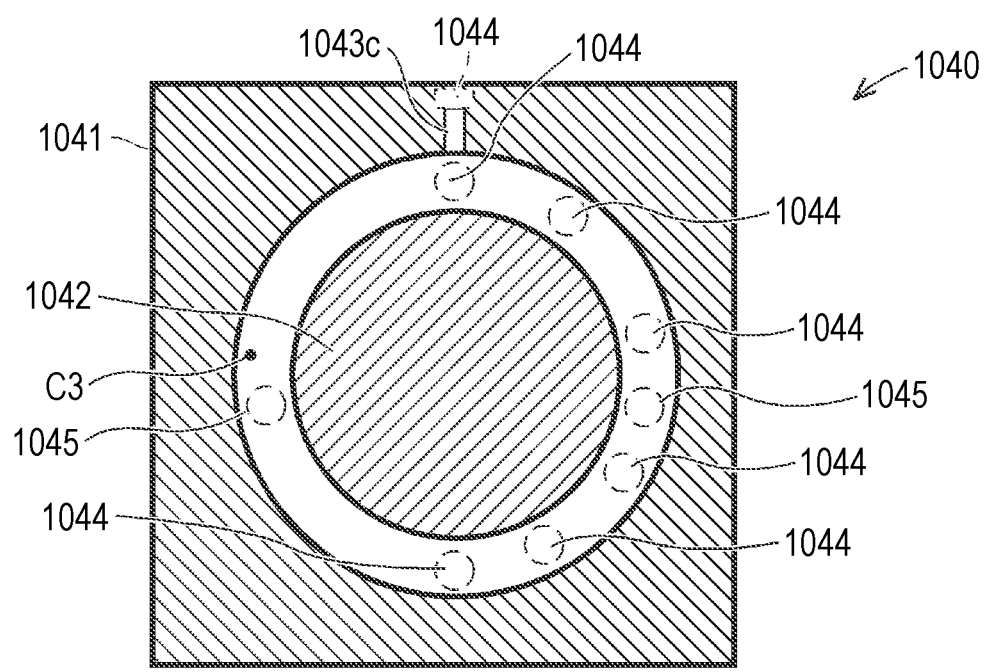
FIG. 28 is a sectional view of the die taken along line III-III in FIG. 27.

A detailed structure of the die 1040 will be described with reference to FIGS. 27 and 28. Although the die 1040 is what is called a multicavity die and is formed with plural cavities C3. However, to simplify the drawings, FIGS. 27 and 28 show only one cavity C3. In this example, the mold product produced by the molding machine 1002 is a holder to be used in a constant velocity joint. Thus, the mold product is ring-shaped and the cavity C3 has a ring shape that conforms to the shape of the holder. The shape of each of the mold product and the cavity C3 may be a shape other than a ring shape, such as a C-shape or a rectangular frame shape.

The supply passage 1043 has a sprue 1043a, a runner 1043b, and a gate 1043c. The sprue 1043a is a passage that is supplied with molten material from the nozzle 1034. The runner 1043b is a passage that branches off the sprue 1043a and the molten material supplied to the sprue 1043a flows into the runner 1043b. The gate 1043c is a passage that guides the molten material that has flown into the runner 1043b to the cavity C3. The passage sectional area of the gate 1043c is smaller than that of the runner 1043b. In actuality, the die 1040 is formed with runners 1043b and gates 1043c in the same number as the cavities C3 and molten material that has been supplied to the sprue 1043a is supplied to the cavities C3 via the runners 1043b and the gates 1043c, respectively.

Where the cavity C3 is ring-shaped and the first die 1041 is formed with one gate 1043c, molten material flows into the cavity C3 from the gate 1043c and flows through the cavity C3 so as to take a circumferential, ring-shaped route. That is, in the cavity C3, molten material first flows to a portion that is close to the gate 1043c and finally flows to a portion that is most distant from the gate 1043c.

In this example, the die 1040 is provided with the plural pressure sensors 1044 for detecting pressures that they receive from molten material existing in the supply passage 1043. For example, the pressure sensors 1044 are provided in the cavity C3 around a position most distant from the gate 1043c and around a position close to the gate 1043c. Pressure sensors 1044 may be provided in the sprue 1043a and the runner 1043b. Each pressure sensor 1044 may be either a contact sensor or a non-contact sensor.

The die 1040 is also provided with the temperature sensors 1045 for detecting temperatures of molten material existing in the supply passage 1043. Like the pressure sensors 1044, the temperature sensors 1045 are preferably provided in the cavity C3 and may be provided in the sprue 1043a or the runner 1043b. Plural temperature sensors 1045 may be provided like the pressure sensors 1044.

4. Configuration of the Molding Conditions Determination Assist Device 1003

The configuration of the molding conditions determination assist device 1003 will be described with reference to FIGS. 29-34. For example, the molding conditions determination assist device 1003 is equipped with a computing device having a processor, a storage device, an interface, etc. and an input device and an output device that can be connected to the interface of the computing device. For example, the output device may be configured so as to include a display device. Alternatively, the computing device, the input device, and the output device may constitute a single unit without intervention of an interface. A physical server or a cloud server may be employed as part of the computing device and part of the storage device.

Figure 29:
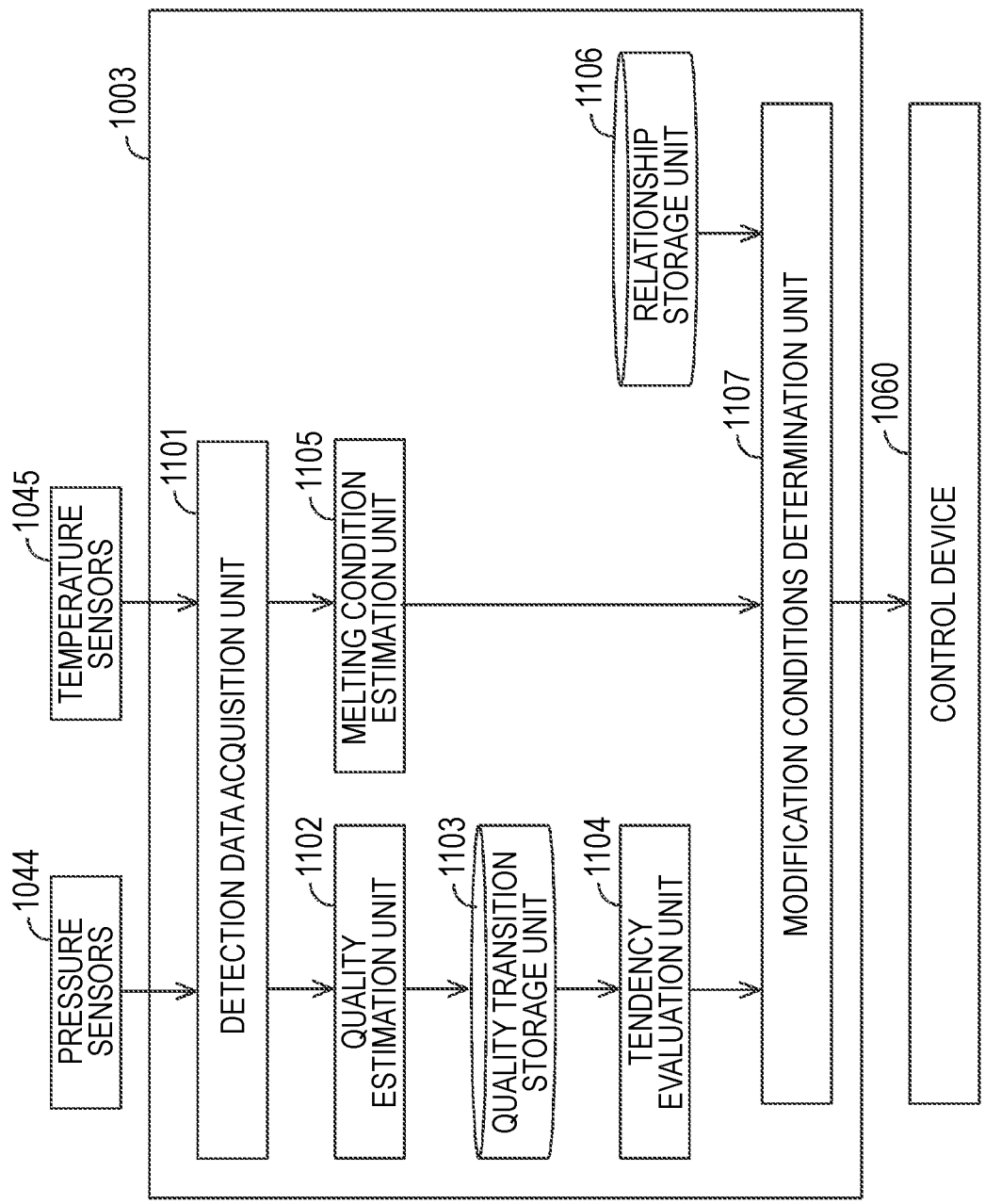
FIG. 29 is a functional block diagram of a molding conditions determination assist device.
Figure 33:
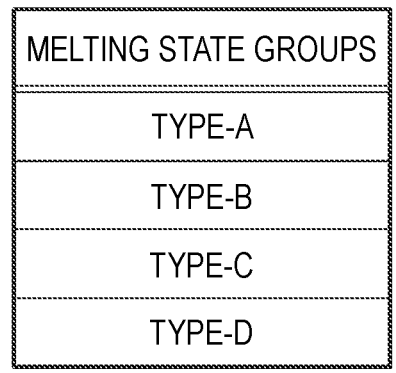
FIG. 33 is a table showing melting state types of molten material.

As shown in FIG. 29, the molding conditions determination assist device 1003 is equipped with a detection data acquisition unit 1101, a quality estimation unit 1102, a quality transition storage unit 1103, a tendency evaluation unit 1104, a melting state estimation unit 1105, a relationship storage unit 1106, and a modification conditions determination unit 1107.

The detection data acquisition unit 101 acquires detection data detected during molding by the sensors 1044 and 1045 which are attached to the molding machine 1002. That is, the items of detection data acquired by the detection data acquisition unit 1101 are at least one of a pressure that the die 1040 receives from molten material in the supply passage 1043 and a temperature of molten material in the supply passage 1043.

FIG. 30 shows example detection data detected by a pressure sensor 1044. In FIG. 30, time T1 is a filling start time, time T2 is a filling end time as well as a holding start time, time T3 is a holding end time as well as a cooling start time, and time T4 is a cooling end time as well as a die opening time. That is, the injection and filling step is from time T1 to time T2, the holding step is from time T2 to time T3, and the cooling step is from time T3 to time T4. In FIG. 30, a maximum holding pressure Pmax is a maximum pressure in the holding step, a holding area Sa is an integrated value of pressure in the holding step, and a cooling area Sb is an integrated value of pressure in the cooling step.

The quality estimation unit 1102 estimates quality of a mold product by machine learning on the basis of detection data acquired by the detection data acquisition unit 1101. For example, the quality estimation unit 1102 estimates a numerical value of one or plural quality items of a mold product. The quality items of a mold product are at least one of the mass, dimension, and void volume of the mold product.

The quality estimation unit 1102 generates, in advance, learned models by learning relationships between the detection data and the quality of a mold product by machine learning. The learned models are generated for respective quality items. The quality estimation unit 1102 is stored with the learned models and estimates quality of a mold product using newly acquired detection data and the learned models.

The quality transition storage unit 1103 accumulates pieces of quality information of mold products estimated by the quality estimation unit 1102 and stores quality transitions of those plural mold products. The quality transition is information that pieces of quality information of plural mold products are arranged in order of molding, such as data (mass data) shown in FIG. 31. In FIG. 31, symbol "Std" represents prescribed standard quality and symbols "Thmax and Thmin" represent an upper limit value and a lower limit value of an allowable quality range, respectively. That is, a mold product whose quality is between the upper limit value Thmax and the lower limit value Thmin is a good product and a mold product whose quality is out of this range is a defective product. Ideally, even good products should have the prescribed standard quality Std.

In FIG. 31, in an initial stage of molding most of mold products show quality values that are close to the standard quality Std excluding a mold product whose quality value is larger than the upper limit value Thmax (a sudden abnormality indicated by symbol "A2"). That is, the mold products produced in the initial stage of molding show values around the standard quality Std (indicated by symbol "A1" in FIG. 31) excluding the mold product of the sudden abnormality. As the molding is continued thereafter, the quality of a mold product departs from the standard quality Std gradually and comes to show values that are larger than the standard quality Std by +N % (indicated by symbol "A3" in FIG. 31).

The tendency evaluation unit 1104 evaluates quality change tendencies with respect to the standard quality Std on the basis of the quality transitions stored in the quality transition storage unit 1103. As shown in FIG. 32, the tendency evaluation unit 1104 evaluates, as quality change tendencies, quality deviations from the standard quality Std and degrees of quality variation of plural mold products for plural respective quality items.

The number of quality transition mold products used for evaluation of quality change tendencies by the tendency evaluation unit 1104 is set in advance. That is, the tendency evaluation unit 1104 calculates quality deviations of mold products of the preset number. For example, the tendency evaluation unit 1104 calculates, as quality deviations, deviations (absolute values or relative values) of quality average values of those mold products from the standard quality Std. The term "degrees of variation" means to what extents the quality items of mold products of the preset number vary (or the quality items of mold products of the preset number are stable). For example, the degrees of variation may be standard deviations, variances, or the like.

For example, as shown in FIG. 32, the tendency evaluation unit 1104 evaluates that the mass has a deviation "+2.2%" and a degree of variation "stable," the dimension has a deviation "+0.3%" and a degree of variation "stable," and the void volume has a deviation "−0.5%" and a degree of variation "stable."

Furthermore, the tendency evaluation unit 1104 produces an evaluation result that the quality transition A1 shown in FIG. 31 has a quality change tendency that the quality is around the standard quality Std stably. In evaluating the quality transition A1 shown in FIG. 31, the tendency evaluation unit 1104 excludes the mold product that showed a quality change of a sudden abnormality (indicated by symbol "A2"). In this case, the tendency evaluation unit 1104 produces an evaluation result that the deviation of the quality item concerned from the standard quality Std is equal to "0.1%" and the degree of variation is "stable." The sudden abnormality is Judged irrelevant to the molding conditions because the quality of mold products returned to normal values after the sudden abnormality. Thus, evaluation is made excluding the sudden abnormality.

The tendency evaluation unit 1104 produces an evaluation result that the quality transition A3 shown in FIG. 31 has a quality change tendency that the quality item concerned is deviated from the standard quality Std by +N % stably. In this case, the tendency evaluation unit 1104 produces an evaluation result that the deviation of the quality item concerned from the standard quality Std is equal to "+N %" and the degree of variation is "stable."

The melting state estimation unit 1105 estimates a melting state of molten material in the cavity C3 on the basis of detection data acquired by the detection data acquisition unit 1101. In particular, the melting state estimation unit 1105 estimates the degree of flowability of molten material as its melting state.

Incidentally, the melting state depends on the components of a molding material (base material). Factors that relate to the components of a molding material (base material) and are considered to influence the melting state include a water content, lengths of reinforcement fibers, a proportion of reinforcement fibers, the molecular weights of main components, etc. And the melting state in the cavity C3 influences detection data obtained during molding. In view of these facts, the melting state estimation unit 1105 is configured so as to be able to estimate a melting state by using detection data that depend on an actual melting state during molding. For example, as show in FIG. 33, melting states are classified into four types, that is, type-A, type-B, type-C, and type-D.

Figure 34:
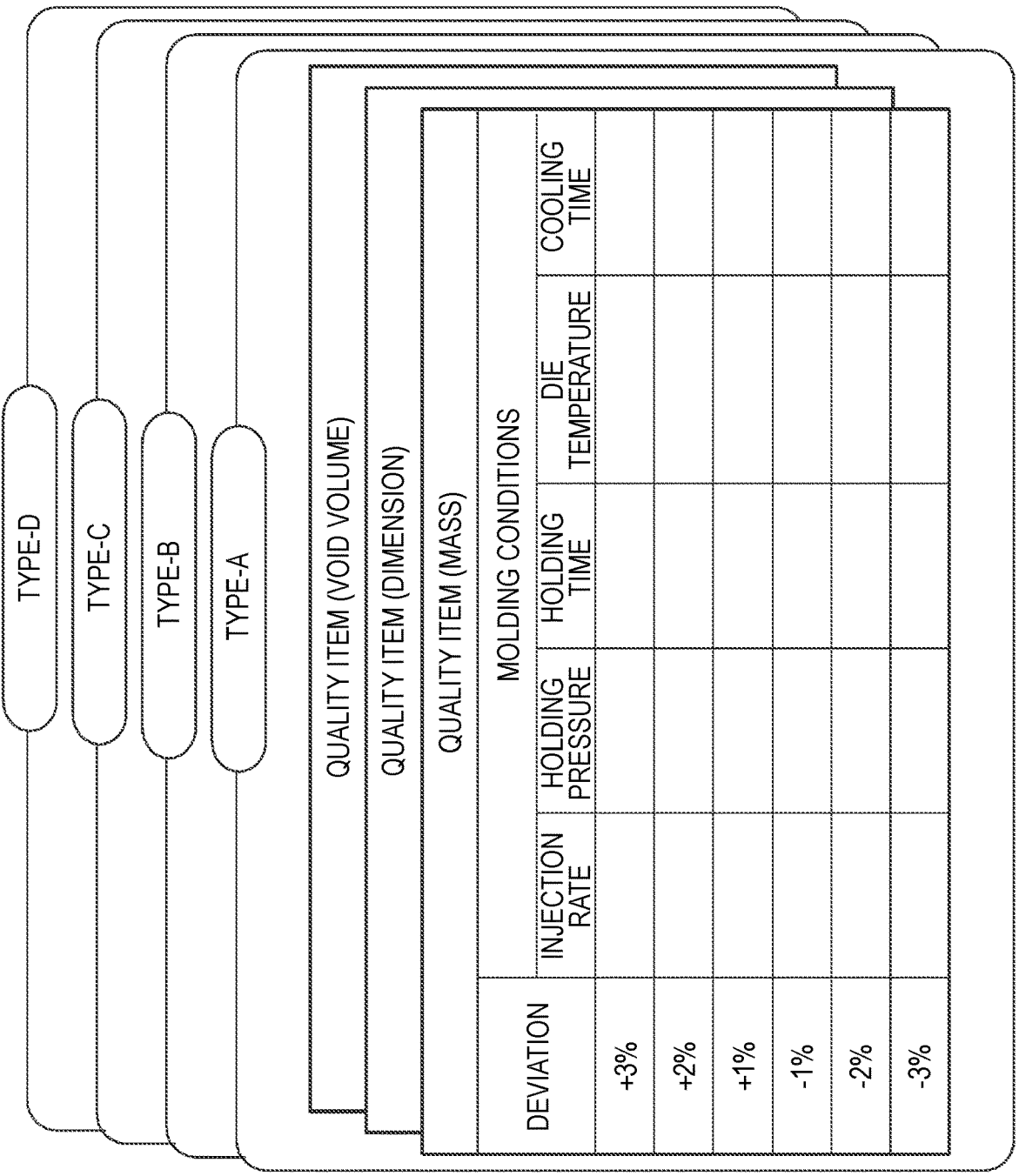
FIG. 34 is tables showing sets of relationships between quality deviations and modification amounts.

The relationship storage unit 1106 is stored with sets of relationships between the quality change tendencies and the modification amounts of molding conditions for returning the quality to the standard quality in such a manner that the sets of relationships are correlated with the respective melting state types of molten material in the cavity C3. For example, as shown in FIG. 34, the relationship storage unit 1106 is stored with, for each type of a molding material melting state, relationships between the quality change tendency and the modification amount of each molding condition. More specifically, the relationship storage unit 1106 is stored with, for each melting state type of molten material and for each quality item, a matrix showing a relationship between the deviation level and the modification amount of each molding condition. For example, six deviation levels are set for each of the mass, dimension, and void volume. Modification target molding conditions are at least one of an injection rate, a holding pressure, a holding time, a holding die temperature, a cooling time, etc.

To what extent each quality item is related to the molding conditions and a relationship between the deviation of each quality item and the modification amounts of the molding conditions can be derived using machine learning. That is, relationships to be stored in the relationship storage unit 1106 can be generated by machine learning. Naturally, such relationships may be set on the basis of experiments, past experiences, etc. rather than by machine learning.

The modification conditions determination unit 1107 determines modification amounts of the molding conditions on the basis of quality change tendencies obtained by the tendency evaluation unit 1104, a molding material melting state estimated by the melting state estimation unit 1105, and the relationships stored in the relationship storage unit 1106.

First, the modification conditions determination unit 1107 selects one corresponding to the melting state estimated by the melting state estimation unit 1105 from the sets of relationships shown in FIG. 34. Then the modification conditions determination unit 1107 determines levels that are closest to deviations obtained by the tendency evaluation unit 1104 in the matrix relationships shown in FIG. 34 and employs modification amounts of the molding conditions corresponding to each determined level. For example, as shown in FIG. 32, when the mass deviation is "+2.2%," a mass deviation level "+2%" in the matrix shown in FIG. 34 is selected.

The modification conditions determination unit 1107 determines modification amounts of the molding conditions for each of the plural quality items. The modification conditions determination unit 1107 determines a final modification amount of each molding condition on the basis of plural modification amounts of the molding condition. In this case, for example, the modification conditions determination unit 1107 may employ, as a final modification amount, the sum of the plural modification amounts or the sum of the plural modification amounts multiplied by weights for the respective quality items.

Furthermore, the modification conditions determination unit 1107 outputs the final correction amounts to the control device 1060 of the molding machine 1002 and thereby causes the molding conditions for the next mold product to be modified by the modification amounts. The control device 1060 performs molding for the next mold product under the modified molding conditions. As a result, the quality of the mold product produced under the modified molding conditions can be made closer to the standard quality Std.

5. Advantageous Effects of Molding Conditions Determination Assist Device 1003

Advantageous effects of the above-described molding conditions determination assist device 1003 will be described below. The quality transition storage unit 1103 accumulates pieces of quality information of mold products estimated by machine learning, and stores quality transitions of those plural mold products. Each quality transition is pieces of information that pieces of quality information of plural mold products are arranged in order of molding. Thus, the tendency evaluation unit 1104 can evaluate a quality change tendency on the basis of a quality transition of plural consecutive mold products.

In particular, the tendency evaluation unit 1104 evaluates quality change tendencies with respect to the prescribed standard quality Std. For example, the tendency evaluation unit 1104 can generate a quality change tendency that a state that a quality item is deviated from the prescribed standard quality Std is continuing, a quality change tendency that a quality item is varying in a quality allowable range including the prescribed standard quality Std, or the like.

Furthermore, the melting state estimation unit 1105 estimates a melting state of molten material in the cavity C3 on the basis of detection data. The melting state depends on the components of a molding material (base material). Factors that relate to the components of a molding material (base material) and are considered to influence the melting state include a water content, lengths of reinforcement fibers, a proportion of reinforcement fibers, the molecular weights of main components, etc. And the melting state in the cavity C3 influences detection data obtained during molding. Thus, the melting state estimation unit 1105 can estimate a melting state during molding using actual detection data that depend on the melting state.

The relationships between the quality change tendencies and the modification amounts of the molding conditions are stored in the relationship storage unit 1106 in advance so as to be correlated with the melting state type of molten material in the cavity C3. That is, the relationships between the quality change tendencies and the modification amounts of the molding conditions are stored in the relationship storage unit 1106 for each of the melting state types of molten material. These relationships have been set using know-how of skilled workers, output results of machine learning, experimental results, etc.

The modification conditions determination unit 1107 determines modification amounts of the molding conditions on the basis of newly evaluated quality change tendencies, a newly estimated melting state of molten material in the cavity C3, and the relationships stored in the relationship storage unit 1106. The relationships stored in the relationship storage unit 1106 relate to the modification amounts of the molding conditions to be used for returning the quality to the standard quality Std. In particular, the modification amounts of the molding conditions have been determined according to a melting state group of molten material in the cavity C3. Thus, the quality of a mold product produced next can be made closer to the prescribed standard quality Std by modifying the molding conditions of the molding machine 1002 according to modification amounts of the molding conditions determined by the modification conditions determination unit 1107.

That is, even in a case that the quality of a mold product is varied by an external factor such as an ambient temperature or slight differences in the components of the molding material (base material), the molding conditions can be modified so that the quality of a mold product becomes the prescribed standard quality Std by recognizing quality change tendencies and, furthermore, a melting state group of molten material in the cavity C3. Thus, not only a skilled worker but also an unskilled worker can modify the molding conditions so that a mold product has good quality.

6. Learning Phase in Quality Estimation

As described above, the quality estimation unit 1102 estimates quality by machine learning. The quality estimation unit 1102 is stored with the learned models that were generated in advance. Generation of learned models, that is, an example learning phase, will be described below.

First, detection data of plural mold products are acquired. Feature quantities of the detection data are extracted on the basis of the detection data. For example, to extract feature quantities, a maximum holding pressure Pmax in the holding step, a pressure variation in the holding step, a holding area Sa (see FIG. 30), an actual holding time (a holding time obtained on the basis of pressure data), a pressure change rate (pressure differentiation value) at a start of the holding step, etc. are used that are obtained from pressure data detected by the pressure sensors 1044. To extract feature quantities, a cooling area Sb (see FIG. 30), a pressure change rate (pressure differentiation value) in the cooling step, etc. are also used that are obtained from the pressure data.

Furthermore, to extract feature quantities, a maximum temperature in the holding step, a temperature variation in the holding step, a temperature area (temperature×time) in the holding step, a cooling area (temperature×time) in the cooling step, a temperature change rate (differentiation value) in the cooling step, etc. are used that are obtained from temperature data detected by the temperature sensors 1045. Since plural pressure sensors 1044 and plural temperature sensors 1045 are provided in the die 1040, the above kinds of information obtained from each sensor are used for extraction of feature quantities.

Plural kinds of information as described above are acquired from each of plural mold products. A maximum value, a minimum value, an average, a variance, etc. of the plural mold products are calculated for each kind of information and employed as feature quantities.

On the other hand, quality items of each of the plural mold products are measured using external measuring instruments etc. For example, a mass, a dimension, a void volume, etc. are measured as quality items. Learned models are generated by performing machine learning using the feature quantities as explanatory variables and the quality items as object variables. The learned models thus generated are models capable of outputting quality items using feature quantities of detection data as inputs Although the above-described learned models employ the feature quantities as explanatory variables, there exist learned models that employ detection data themselves, rather than the feature quantities, as explanatory variables and can output a quality item as object variable.

7. Melting State of Molten Material in Cavity C3

7-1. Relationship Between Melting State and Quality

Where a molten material in the cavity C3 is high in flowability, its specific volume in the cavity C3 can increase. Thus, the melting state of molten material influences the quality of a mold product.

For example, the flowability of molten material is influenced by the content of water absorbed by pellets that are the molding material (base material). The water in the pellets causes hydrolysis in the molten material to increase its flowability. The probability of occurrence of hydrolysis tends to be higher as the water content of a molding material increases. The lengths, proportion, etc. of reinforcement fibers contained in the pellets that are the molding material (base material) as well as the molecular weights of main components of the molding material are also considered to influence the flowability of molten material.

7-2. Relationship Between Melting State and Detection Data

The time taken for molten material to fill up the cavity C3 (hereinafter referred to as a "cavity filling time") varies depending on the melting state of molten material in the cavity C3. The cavity filling time is a time taken from a start of filling of the cavity C3 with molten material to its completion.

For example, the start time of a cavity filling time can be a time when detection data of the pressure sensor 1044 closest to the gate 1043c among the pressure sensors 1044 disposed inside the cavity C3 has increased. Alternatively, the start time of a cavity filling time can be defined using detection data of a pressure sensor 1044 disposed in the runner 1043b. The completion time of the cavity filling time can be a time when detection data of the pressure sensor 1044 most distant from the gate 1043c among the pressure sensors 1044 disposed inside the cavity C3 has increased.

The melting state estimation unit 1105 can estimate a melting state of molten material in the cavity C3 using the cavity filling time. A relationship between the cavity filling time and the melting state can also be acquired using machine learning.

A relationship between the cavity filling time and the melting state can be recognized more accurately by performing machine learning with reference to a test result document of the molding material (base material). That is, the melting state estimation unit 1105 can estimate a melting state of molten material by machine learning by referring to a test result document of the molding material (base material) in addition to using detection data (in particular, cavity filling time). The test result document of the molding material (base material) includes the molecular weights of main components, a water content, a kind, lengths, and a proportion of reinforcement fibers, etc.

7-3. Another Melting State Estimation Method

As described above, a melting state can be estimated using a cavity filling time. A melting state can also be estimated by the following method.

It is apparent that the values of detection data, obtained during molding, of the pressure sensors 1044 and the temperature sensors 1045 are influenced by the molding conditions of the molding machine 1002. Furthermore, the values of detection data are considered to be influenced by the melting state of molten material in the cavity C3 in addition to the molding conditions.

That is, the values of detection data are influenced by the molding conditions and the melting state of molten material. For example, this relationship can be expressed as follows: a value of detection data is the product of a value relating to molding conditions and a value relating to a melting state of molten material. In other words, a value representing a melting state of molten material is given by dividing a value relating to molding conditions by a value of detection data.

In view of the above, feature quantities of plural sets of detection data are acquired and multiplied together. Furthermore, values of plural molding conditions are acquired and multiplied together A quotient obtained by dividing the product of the plural molding conditions by the product of the feature quantities of the plural sets of detection data is employed as an index representing a melting state of molten material in the cavity C3. A type of a melting state can be judged by classifying melting states obtained in this manner. A melting state of molten material in the cavity C3 can be estimated in this manner.

8. Learning Phase for Determination of Relationships

For example, relationships between the quality deviations and the modification amounts to be stored in the relationship storage unit 1106 can be generated using machine learning. A case of generating such relationships using machine learning will be described below.

8-1. First Example

Figure 35:
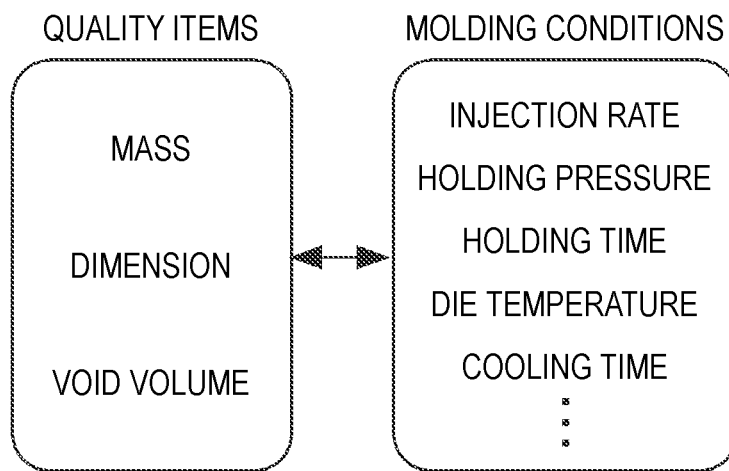
FIG. 35 is a diagram showing a first example learning phase for determination of relationships between the quality deviations and the modification amounts.

A first example learning phase will be described with reference to FIG. 35. In the first example learning phase, as shown in FIG. 35, relationships between the quality items and the molding conditions are generated directly by machine learning.

For example, quality values of the respective quality items and values of the molding conditions are input and to what degrees (degrees of contribution and degrees of influence) the molding conditions influence the quality items are acquired by machine learning. Furthermore, to what degrees the modification amounts of the molding conditions influence the quality items may also be acquired. As a result, information indicating relationships between the quality items and the molding conditions and, furthermore, information indicating relationships between the quality items and the modification amounts of the molding conditions can be obtained.

A person determines relationships that are expressed in the form of matrices as shown in FIG. 34 on the basis of the relationship information obtained by the machine learning. Naturally, matrices as shown in FIG. 34 can be generated by machine learning.

8-2. Second Example

Figure 36:
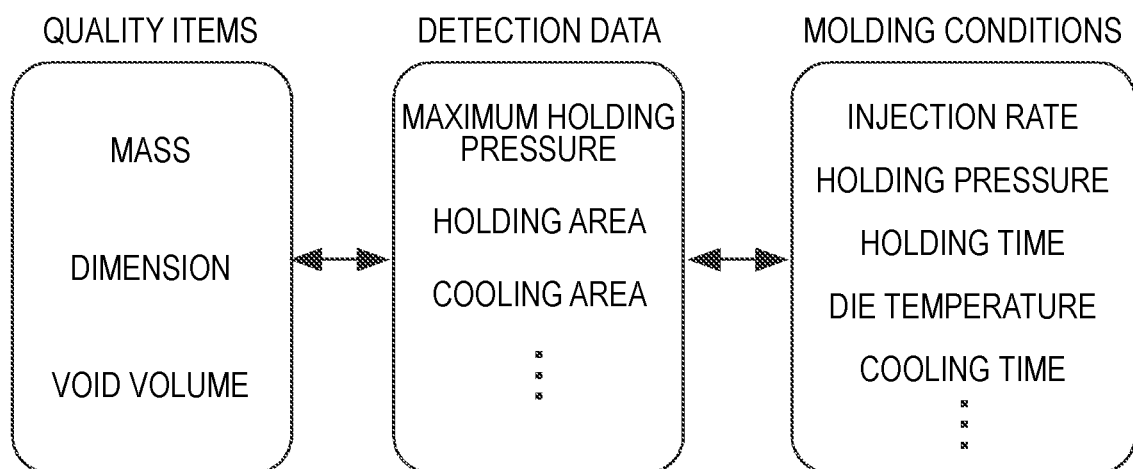
FIG. 36 is a diagram showing a second example learning phase for determination of relationships between the quality deviations and the modification amounts.

A second example learning phase will be described with reference to FIG. 36. In the second example learning phase, as shown in FIG. 36, relationships between the quality items and the molding conditions are generated indirectly by machine learning.

In the first example shown in FIG. 35, relationships between the quality items and the molding conditions are generated directly by machine learning. However, there may occur a case that relationships between the quality items and the molding conditions cannot be obtained directly. It is apparent that molding conditions determine states in molding which then determine quality. That is, it can be said that molding conditions and quality have certain relationships via states in molding. For example, the states in molding are a maximum holding pressure Pmax, a holding area Sa, a cooling area Sb, etc.

In view of the above, first, quality values of the respective quality items and feature quantities (feature quantities obtained from a maximum holding pressure etc.) of detection data are input and to what degrees (degrees of contribution and degrees of influence) the feature quantities of the detection data influence the quality items are acquired by machine learning. Furthermore, to what degrees the values of the feature quantities of the detection data influence the values of the quality items may also be acquired. As a result, information indicating relationships between the quality items and the feature quantities of the detection data and, furthermore, information indicating relationships between the values of the quality items and the modification amounts of the feature quantities of the detection data can be obtained.

Next, the feature quantities of the detection data and values of the molding conditions are input and to what degrees (degrees of contribution and degrees of influence) the molding conditions influence the feature quantities of the detection data are acquired. Furthermore, to what degrees the modification values of the molding conditions influence the feature quantities of the detection data may also be acquired. As a result, information indicating relationships between the feature quantities of the detection data and the molding conditions and, furthermore, information indicating relationships between the feature quantities of the detection data and the modification amounts of the molding conditions can be obtained.

Then a person determines relationships that are expressed in the form of matrices as shown in FIG. 34 on the basis of the information indicating the relationships between the quality items and the feature quantities of the detection data, the information indicating the relationships between the feature quantities of the detection data and the molding conditions, etc. Naturally, matrices as shown in FIG. 34 can be generated by machine learning.

9. Operation Timing of Molding Machine System 1001

9-1. Basics

The operation timing of the molding machine system 1001, in particular, the operation timing between the process executed by the molding machine 1002 and the process executed by the molding conditions determination assist device 1003, will be described with reference to FIG. 37. It is assumed that the molding machine 1002 produces mold products continuously. To simplify the description, a description will be made of a case that a second mold product is produced after a first mold product.

Figure 37:
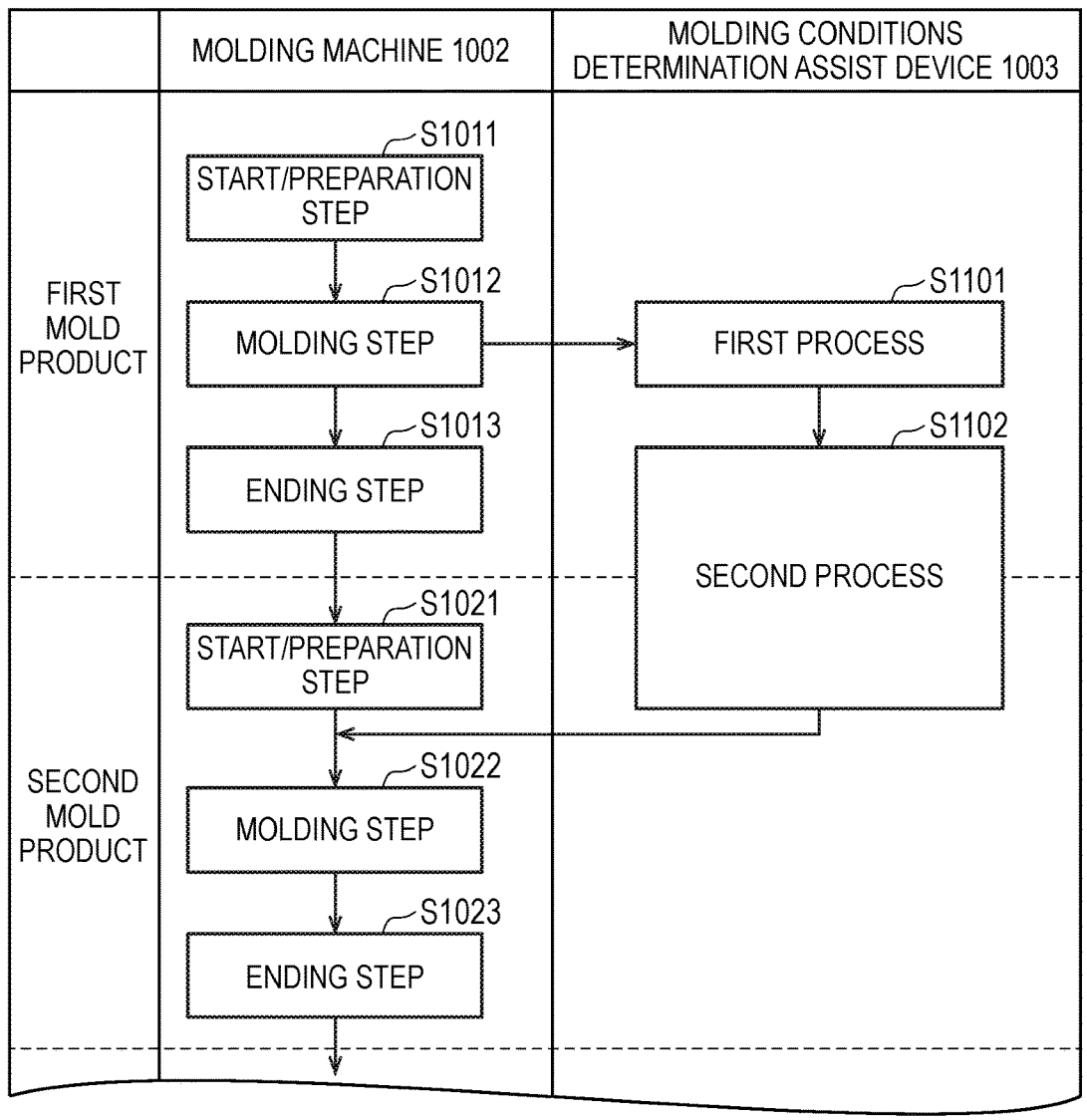
FIG. 37 is a chart showing operation timing between a process executed by the molding machine and a process executed by the molding conditions determination assist device in which time elapses downward.

As shown in FIG. 37, at step S1011, the molding machine 1002 executes a start/preparation step for a first mold product. For example, the start/preparation step includes an amount measuring step and a clamping step. At step S1012, the molding machine 1002 executes a molding step to produce a first mold product. The molding step includes an injection and filling step, a holding step, and a cooling step. At step S1013, the molding machine 1002 executes an ending step for the first mold product. For example, the ending step includes a release and ejection step.

Where the molding conditions determination assist device 1003 uses detection data detected by the pressure sensors 1044 and the temperature sensors 1045 in an initial part (immediately after die opening) of the release and ejection step, the initial part of the release and ejection step may be included in the molding step.

After molding the first mold product, the molding machine 1002 starts a process for molding a second mold product. First, at step S1021, the molding machine 1002 executes a start/preparation step for a second mold product. At step S1022, the molding machine 1002 executes a molding step to produce a second mold product. At step S1023, the molding machine 1002 executes an ending step for the second mold product.

On the other hand, the molding conditions determination assist device 1003 operates parallel with the molding machine 1002. More specifically, the molding conditions determination assist device 1003 executes a first process S1101 in parallel with detection of data by the pressure sensors 1044 and the temperature sensors 1045 in the molding of the first mold product and executes a second process S1102 in parallel with the ending step S1013 for the first mold product and the start/preparation step S1021 for the second mold product. That is, the second process S1102 is executed parallel with a preparation step of the molding machine 1002 from the end of the molding step S1012 for the first mold product to the start of the molding step S1022 for the second mold product (i.e., the ending step S1013 for the first molding product and the start/preparation step S1021 for the second mold product).

The first process S1101 includes at least a process executed by the detection data acquisition unit 1101. The second process S1102 includes at least a process executed by the modification conditions determination unit 1107. The modification conditions determination unit 1107 determines modification amounts of the molding conditions for the second mold product. That is, in the molding step S1022 for the second mold product, the molding machine 1002 uses molding conditions as modified using data obtained in the molding step S1012 for the first mold product. In this manner, modification amounts of the molding conditions are determined in one molding cycle for a mold product. Since molding information obtained immediately before can be used in determining modification amounts of the molding conditions, the modification amounts of the molding conditions can be made suitable for the current situation with higher accuracy.

9-2. First Example

A first example process executed by the molding conditions determination assist device 1003 is as follows. The detection data acquisition unit 1101 operates in the first process S1101. On the other hand, the quality estimation unit 1102, the tendency evaluation unit 1104, and the modification conditions determination unit 1107 operate in the second process S1102.

8-3. Second Example

A second example process executed by the molding conditions determination assist device 1003 is as follows. The detection data acquisition unit 1101 and the quality estimation unit 1102 operate in the first process S1101. On the other hand, the tendency evaluation unit 1104 and the modification conditions determination unit 1107 operate in the second process S1102.

10. Example Configurations of Molding Machine System 1001

10-1. First Example

Figure 38:
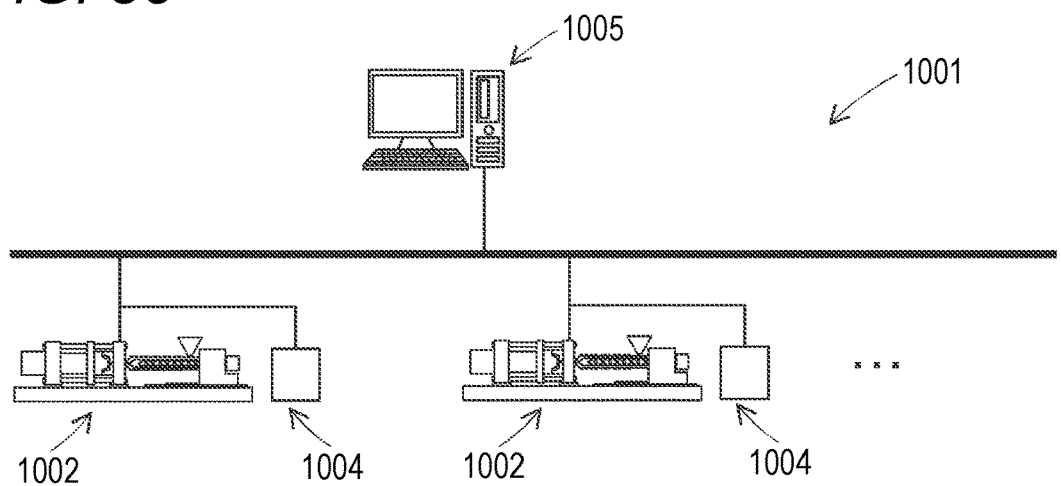
FIG. 38 is a diagram showing an example configuration of a molding machine system.

The configuration of a first example molding machine system 1001 will be described with reference to FIG. 38. As shown in FIG. 38, the molding machine system 1001 is equipped with plural molding machines 1002, edge computers 1004 which are integrated with the respective molding machines 1002, and a server 1005 which constitutes the same network with the plural molding machines 1002. Each edge computer 1004 may either be part of or be separate from the associated molding machine 1002.

The edge computers 1004 and the server 1005 constitute a molding conditions determination assist device 1003. Each edge computer 1004 is equipped with the detection data acquisition unit 1101. The server 1005 is equipped with the quality estimation unit 1102, the quality transition storage unit 1103, the tendency evaluation unit 1104, the melting state estimation unit 1105, the relationship storage unit 1106, and the modification conditions determination unit 1107.

That is, the server 1005 receives detection data acquired by the detection data acquisition unit 1101 from each edge computer 1004 that is separate from or is incorporated in the associated molding machine 1002. The server 1005 determines modification amounts of the molding conditions on the basis of the received information and transmits the determined modification amounts of the molding conditions to the molding machine 1002.

In this case, the server 1005 can accumulate information relating to the plural molding machines 1002. Furthermore, the quality estimation unit 1102, the tendency evaluation unit 1104, the melting state estimation unit 1105, and the modification conditions determination unit 1107 can perform processing at high speed by having the server 1005 equipped with a processor capable of high-speed processing. On the other hand, the cost of each edge computer 1004 can be made low because it need not be of a high-level specification.

10-2. Second Example

As in the first example, a second example molding machine system 1001 is equipped with plural molding machines 1002, edge computers 1004 which are connected to the respective molding machines 1002, and a server 1005 which constitutes the same network with the plural molding machines 1002.

Each edge computer 1004 is equipped with the detection data acquisition unit 1101, the quality estimation unit 1102, and the melting state estimation unit 1105. The server 1005 is equipped with the quality transition storage unit 1103, the tendency evaluation unit 1104, the relationship storage unit 1106, and the modification conditions determination unit 1107. That is, the server 1005 receives quality of a mold product estimated by the quality estimation unit 1102 and a melting state estimated by the melting state estimation unit 1105 from each edge computer 1004 that is separate from or is incorporated in the associated molding machine 1002. The server 1005 determines modification amounts of the molding conditions on the basis of the received information and transmits the determined modification amounts of the molding conditions to the molding machine 1002.

10-3. Third Example

In a third example molding machine system 1001, a server 1005 has all the functions. In this case, no edge computers 1004 are necessary. The detection data acquisition unit 1101 of the server 1005 receives detection data detected by the sensors 1044 and 1045 from each molding machine 1002. The modification conditions determination unit 1107 of the server 1005 transmits modification amounts of the molding conditions to the molding machine 1002.

What is claimed is:

1. A molding conditions determination assist device which is applied to a molding method of producing a plurality of mold products by supplying a molten material obtained by melting a molding material to a cavity of a die of a molding machine and determines molding conditions including at least two of an injection rate, a holding pressure, a holding time, a holding die temperature, and a cooling time for producing the mold products, the molding conditions determination assist device comprising:

a detection data acquisition unit which acquires detection data detected during a molding by sensors attached to the molding machine, the sensors including pressure sensors that detect pressures received from the molten material supplied to the cavity and temperature sensors that directly detect temperatures of the molten material in the cavity;

a quality estimation unit which estimates quality of the mold products by a machine learning on the basis of the detection data, quality items of the mold product including at least two of a mass, a dimension, and a void volume of the mold product;

a quality transition storage unit which accumulates the quality of the mold products estimated by the quality estimation unit and stores a quality transition with respect to the accumulated quality of the mold products, the quality transition including pieces of information in which pieces of quality information of the plurality of mold products are arranged in order of molding;

a tendency evaluation unit which evaluates a quality change tendency with respect to a prescribed standard quality on the basis of the quality transition, the quality change tendency being based on a stable deviation of the quality of the mold products from the prescribed standard quality;

a relationship storage unit which stores a relationship between the quality change tendency and a modification amount of the molding conditions including the at least two of the injection rate, the holding pressure, the holding time, the holding die temperature, and the cooling time for returning the quality to the standard quality for each of a plurality of melting states such that the relationship includes a first relationship for a first of the melting states that is one-to-one relationship between ones of a first plurality of different quality change tendencies and ones of a first plurality of modification amounts of the holding pressure, a second relationship for a second of the melting states that is one-to-one relationship between ones of a second plurality of different quality change tendencies and ones of a second plurality of modification amounts of the holding pressure, a third relationship for a third of the melting states that is one-to-one relationship between ones of a third plurality of different quality change tendencies and ones of a third plurality of modification amounts of the holding pressure, and a fourth relationship for a fourth of the melting states that is one-to-one relationship between ones of a fourth plurality of different quality change tendencies and ones of a fourth plurality of modification amounts of the holding pressure;

a melting state estimation unit which estimates a melting state of the molten material in the cavity on the basis of the detection data, the melting state being one of the plurality of melting states including the first of the melting states, the second of the melting states, the third of the melting states, and the fourth of the melting states; and a modification conditions determination unit which determines the modification amount of the molding conditions including the at least two of the injection rate, the holding pressure, the holding time, the holding die temperature, and the cooling time on the basis of the quality change tendency obtained by the tendency evaluation unit, the melting state estimated by the melting state estimation unit, and the relationship including the first relationship, the second relationship, the third relationship, and the fourth relationship stored in the relationship storage unit, wherein the molding conditions determination assist device is applied to the molding method of producing a first mold product and a second mold product following the first mold product, the detection data acquisition unit operates on the basis of the detection data relating to the first mold product, the modification conditions determination unit determines the modification amount of the molding conditions including the at least two of the injection rate, the holding pressure, the holding time, the holding die temperature, and the cooling time with respect to the second mold product, and the modification amount of the molding conditions including the at least two of the injection rate, the holding pressure, the holding time, the holding die temperature, and the cooling time are used to control the molding machine to modify the at least two of the injection rate, the holding pressure, the holding time, the holding die temperature, and the cooling time to mold the second mold product.

2. The molding conditions determination assist device according to claim 1, wherein the melting state estimation unit estimates the melting state of the molten material as the one of the plurality of melting states including the first of the melting states, the second of the melting states, the third of the melting states, and the fourth of the melting states on the basis of a degree of flowability of the molten material by the machine learning.

3. The molding conditions determination assist device according to claim 2, wherein the melting state estimation unit estimates the degree of flowability of the molten material as the one of the plurality of melting states including the first of the melting states, the second of the melting states, the third of the melting states, and the fourth of the melting states on the basis of a filling time taken from a start to a completion of a filling of the molten material into the cavity, the filling time being obtained from the detection data.

4. The molding conditions determination assist device according to claim 1, wherein the melting state estimation unit estimates the melting state of the molten material as the one of the plurality of melting states including the first of the melting states, the second of the melting states, the third of the melting states, and the fourth of the melting states on the basis of the detection data and the molding conditions.

5. The molding conditions determination assist device according to claim 1, wherein the melting state estimation unit estimates the melting state of the molten material as the one of the plurality of melting states including the first of the melting states, the second of the melting states, the third of the melting states, and the fourth of the melting states with reference to a test result document with respect to a base material of the molding material in addition to the detection data.

6. The molding conditions determination assist device according to claim 1, wherein the tendency evaluation unit excludes a quality change due to a sudden abnormality to evaluate the quality change tendency.

7. The molding conditions determination assist device according to claim 1, wherein:
the tendency evaluation unit evaluates, as the quality change tendency, a deviation of the quality items from the standard quality; and
the relationship expresses, for each of the quality items, a level of the deviation and the modification amount of the molding conditions including the at least two of the injection rate, the holding pressure, the holding time, the holding die temperature, and the cooling time with a matrix.

8. The molding conditions determination assist device according to claim 7, wherein the modification conditions determination unit:
determines the closest level to the deviation obtained by the tendency evaluation unit in the relationship expressed with the matrix, and
defines the modification amount of the molding conditions including the at least two of the injection rate, the holding pressure, the holding time, the holding die temperature, and the cooling time corresponding to the closest level as the modification amount of the molding conditions including the at least two of the injection rate, the holding pressure, the holding time, the holding die temperature, and the cooling time to be determined.

9. The molding conditions determination assist device according to claim 1, wherein:
the relationship is determined on the basis of relationship information between the quality items as the quality change tendency estimated by the machine learning and items of molding conditions including the injection rate, the holding pressure, the holding time, the holding die temperature, and the cooling time; or
the relationship is determined on the basis of relationship information between feature quantities of the detection data estimated by the machine learning and the quality items as the quality change tendency, and relationship information between the feature quantities of the detection data estimated by the machine learning and the items of molding conditions including the injection rate, the holding pressure, the holding time, the holding die temperature, and the cooling time.

10. The molding conditions determination assist device according to claim 1, wherein:
the molding conditions determination assist device is applied to the molding method of producing the mold products continuously; and
the quality estimation unit, the tendency evaluation unit, and the modification conditions determination unit operate parallel with a preparation step of the molding machine performed before a start of molding of the second mold product.

11. The molding conditions determination assist device according to claim 1, further comprising a server which constitutes the same network with a plurality of molding machines having the molding machine, wherein:
the server comprises at least the relationship storage unit and the modification conditions determination unit; and
the server is configured to:
receive one of the detection data detected by the sensors, the detection data acquired by the detection data acquisition unit, and the quality of one of the mold products estimated by the quality estimation unit, from each of the molding machines or a computer incorporated in each of the molding machines;
determine the modification amount of the molding conditions on the basis of the received one of the detection data detected by the sensors; and
transmit the determined modification amount of the molding conditions to each of the molding machines.

* * * * *